US009332300B2

(12) United States Patent
Jung

(10) Patent No.: US 9,332,300 B2
(45) Date of Patent: May 3, 2016

(54) APPARATUS AND METHOD FOR CONTROLLING DISPLAY OF INFORMATION ON A TELEVISION

(75) Inventor: Daeyoung Jung, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 13/396,412

(22) Filed: Feb. 14, 2012

(65) Prior Publication Data

US 2012/0284752 A1 Nov. 8, 2012

(30) Foreign Application Priority Data

May 6, 2011 (KR) ........................ 10-2011-0042836

(51) Int. Cl.
| | | |
|---|---|---|
| H04N 5/445 | (2011.01) | |
| G06F 3/00 | (2006.01) | |
| G06F 13/00 | (2006.01) | |
| H04N 21/431 | (2011.01) | |
| H04N 21/488 | (2011.01) | |
| H04N 21/482 | (2011.01) | |

(52) U.S. Cl.
CPC ........... H04N 21/431 (2013.01); H04N 21/488 (2013.01); H04N 21/4821 (2013.01); H04N 21/4826 (2013.01)

(58) Field of Classification Search
None
See application file for complete search history.

(56) References Cited

U.S. PATENT DOCUMENTS

| | | | | |
|---|---|---|---|---|
| 6,312,336 B1 * | 11/2001 | Handelman | ............. | A63F 13/12 348/E5.105 |
| 7,987,491 B2 * | 7/2011 | Reisman | ....................... | 725/112 |
| 8,060,827 B2 * | 11/2011 | Fischer et al. | ................ | 715/745 |
| 8,166,120 B2 * | 4/2012 | Kunz | ................... | G06Q 10/107 455/412.1 |
| 8,613,031 B2 * | 12/2013 | McMurtrie | ........ | H04N 7/17318 709/219 |
| 8,782,680 B2 * | 7/2014 | Cook et al. | ......................... | 725/9 |
| 8,849,199 B2 * | 9/2014 | Shrum et al. | ................. | 455/41.2 |
| 2002/0108113 A1 * | 8/2002 | Schaffer et al. | ................. | 725/46 |
| 2003/0067554 A1 * | 4/2003 | Klarfeld et al. | ............... | 348/461 |
| 2007/0107015 A1 * | 5/2007 | Kazama et al. | ................. | 725/58 |
| 2007/0204308 A1 * | 8/2007 | Nicholas et al. | ................ | 725/86 |
| 2009/0241160 A1 * | 9/2009 | Campagna et al. | ........... | 725/131 |
| 2009/0271826 A1 * | 10/2009 | Lee et al. | ........................ | 725/46 |
| 2010/0095343 A1 * | 4/2010 | Kaihotsu | ....................... | 725/118 |
| 2010/0242074 A1 * | 9/2010 | Rouse et al. | ................... | 725/100 |
| 2010/0269144 A1 * | 10/2010 | Forsman et al. | ................ | 725/92 |
| 2010/0293578 A1 * | 11/2010 | Seong et al. | ..................... | 725/46 |
| 2011/0107382 A1 * | 5/2011 | Morris et al. | ................. | 725/109 |
| 2011/0219405 A1 * | 9/2011 | McRae | ........................... | 725/39 |
| 2011/0276628 A1 * | 11/2011 | Pell | ................................ | 709/204 |
| 2012/0174157 A1 * | 7/2012 | Stinson et al. | .................. | 725/40 |
| 2012/0210377 A1 * | 8/2012 | Wong et al. | .................. | 725/109 |

* cited by examiner

Primary Examiner — Jonathan V Lewis

(74) Attorney, Agent, or Firm — KED & Associates LLP

(57) ABSTRACT

An apparatus for a television includes an on-screen display (OSD) generator, a first interface to receive signals for controlling a television, a first storage area to store information relating to a plurality of channels, a second interface to receive data from a social network service (SNS), and a second storage area to store the SNS data. A controller of the apparatus controls the OSD generator to simultaneously output for display program information of the plurality of channels. The program information is output based on the stored SNS data, and the stored SNS data is based on a plurality of members of the social network service.

18 Claims, 19 Drawing Sheets

FIG. 5

| SNS friend | IP address |
|---|---|
| A user | 130.69.241.7 |
| B user | 120.72.340.8 |
| C user | 111.45.123.5 |
| ⋮ | ⋮ |

FIG. 6

| Channel \ List | number of recommendations | number of replies | number of viewers |
|---|---|---|---|
| 6-1 (SBC) | 7 | 4 | 4 |
| 7-1 (KBC) | 3 | 2 | 10 |
| 10-1 (EBS) | 4 | 1 | 2 |
| ⋮ | ⋮ | ⋮ | ⋮ |

| Time\Channel | 9:00 | | 10:00 |
|---|---|---|---|
| EBC | WAR II  1712<br>1711— 👍17  💬4  👥5 —1713 | | Love Movie<br>👍23  💬8  👥17 |
| MBS | 24 hours<br>👍2  💬3  👥4 | Baseball News<br>👍85  💬72  👥67 | X-MAS<br>👍12  💬4  👥5 |
| SBC | Drama 2<br>👍9  💬1  👥1 | Sunny KIM<br>👍12  💬24  👥6 | Tiger<br>👍7  💬8  👥10 |

Electronic Program Guide — 1710

1700

APPARATUS AND METHOD FOR CONTROLLING DISPLAY OF INFORMATION ON A TELEVISION

Pursuant to 35 U.S.C. §119(a), this application claims the benefit of the earlier filing date and right of priority to Korean Application No. 10-2011-0042836, filed on May 6, 2011, the contents of which are incorporated by reference.

BACKGROUND

1. Field

One or more embodiments herein relate to display of information.

2. Background

Televisions have been integrated to provide programming from a variety of sources including broadcast signals, Internet websites, DVDs, and portable media terminals as well as other sources. There are so many sources and, consequently, so many programs that the viewing experience can be overwhelming at times. The ability to receive information from other users or from other sources regarding programming or other information would serve to enhance the entertainment value of the televisions and the services they provide.

BRIEF DESCRIPTION OF THE DRAWINGS

FIG. 5 shows an example of a database for use in providing a channel guide function.

FIG. 6 shows another example of a database for use in providing a channel guide function.

FIG. 17 shows a first embodiment of a user interface for applying one or more embodiments to an electronic program guide (EPG).

DETAILED DESCRIPTION

Figure 1:
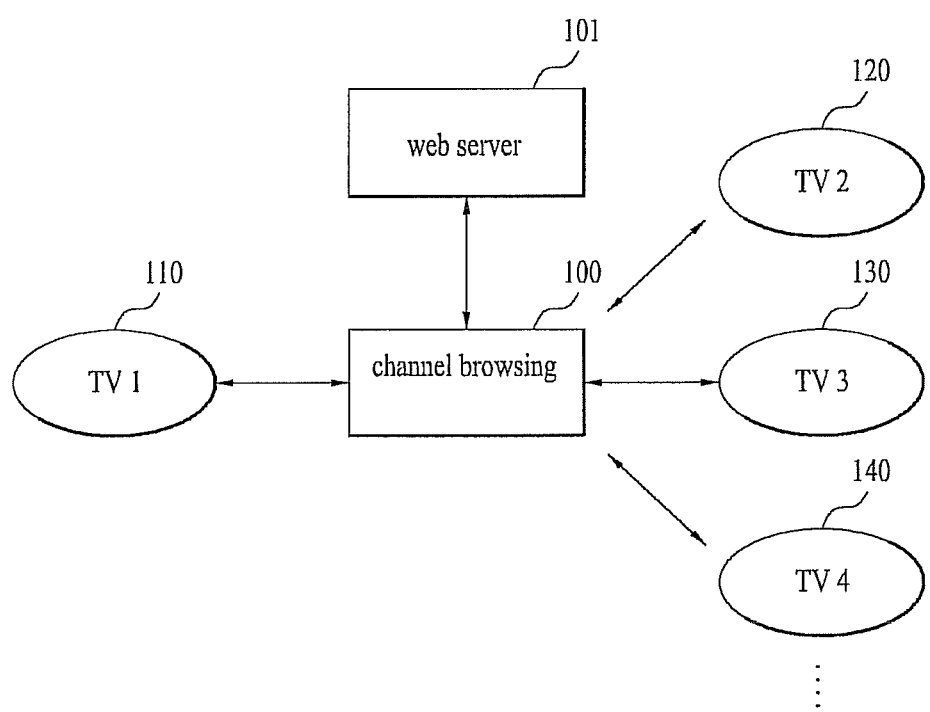
FIG. 1 shows one embodiment of a plurality of display apparatuses coupled to one another in a system that performs a channel guide function.

FIG. 1 shows one embodiment of a system for performing a channel guide function in association with a display device, which, for example, may be a television (TV) or other type of device as described herein. The channel guide may, for example, provide an indication of a function of displaying video data corresponding to broadcast data currently broadcasted on each channel. Additionally, or alternatively, the channel guide may perform this function for broadcast or signals from other sources (local or remote) for previously broadcast signals, for information derived from an Internet or other network source, from a DVD or other type of attached device, or a combination thereof. And, the above-mentioned channel guide may be used in a manner of being substituted by a channel browser or a channel browsing.

Referring to FIG. 1, a $1^{st}$ TV 110 may be designed to receive social network service (SNS)-related data from a channel browsing server 100. Alternatively, other types of display apparatuses may be substituted for the $1^{st}$ TV 110.

The channel browsing server 100 may be designed to save a list of friends, who belong to a specific SNS to which a user of the $1^{st}$ TV 110 has subscribed, in a database. Hence, the channel browsing server 100 may be able to obtain viewing logs or channel statuses of TVs 120, 130 and 140 used by the friends in the specific SNS by real time. One embodiment for obtaining information on friends in a specific SNS may be described in detail with reference to FIG. 5 and FIG. 6 later.

The channel browsing server 100 may access a web server 101 to collect information on the number of recommendations for the specific channel, information on a reply message and the like. In particular, when the $1^{st}$ TV 110 according to one embodiment executes the channel browsing function, the channel browsing server 100 may transmit a plurality of data collected from the TVs 120, 130 and 140 of the users registered as SNS friends or the web server 101 to the $1^{st}$ TV 110.

In brief, the channel browsing server 100 may have the information on the list of the friends in the SNS to which the user of the $1^{st}$ TV 110 has subscribed. And, the database of the channel browsing server 100 may contain information indicating which broadcast is currently viewed by each of the friends currently accessing the corresponding SNS, the number of recommendations for the specific channel, the reply messages and the like. Hence, the $1^{st}$ TV 110 may be able to collect various kinds of SNS related information from the aforesaid channel browsing server 100.

Figure 2:
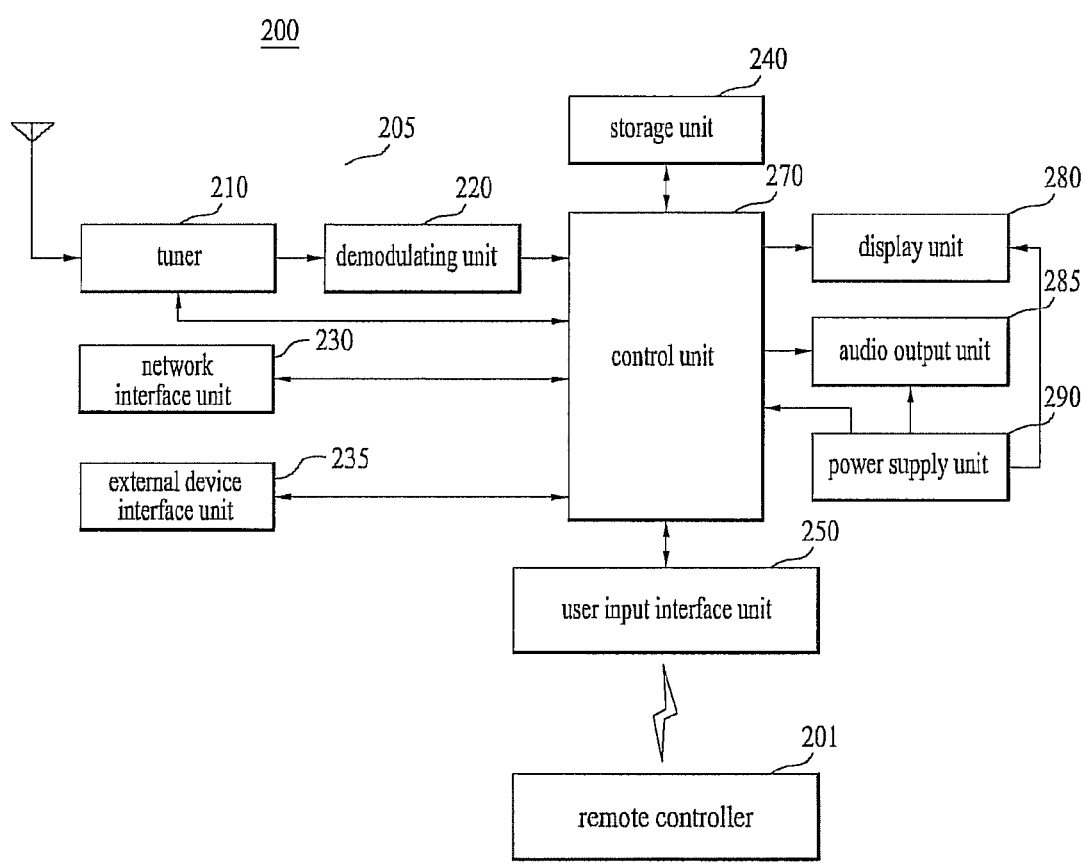
FIG. 2 shows one embodiment of a display apparatus for performing a channel guide function.

FIG. 2 is a block diagram of modules of a display apparatus for providing a channel guide function according to one embodiment. In the following description, an example of modules configuring a display apparatus for providing a channel guide function is described with reference to FIG. 2. In other embodiments, some modules may bee deleted from the corresponding configuration or new modules may be added.

Referring to FIG. 2, a display apparatus 200 may include a broadcast receiving unit 205, an external device interface unit 235, a storage unit 240, a user input interface unit 250, a control unit 270, a display unit 280, an audio output unit 285, a power supply unit 290 and a photographing unit (not shown in the drawing).

The broadcast receiving unit 205 may include a tuner 210, a demodulating unit 220 and a network interface unit 230. Of course, if necessary, the broadcast receiving unit 205 may be designed to include the tuner 210 and the demodulating unit 220 without the network interface unit 230. On the other hand, the broadcast receiving unit 205 may be designed to include the network interface unit 230 only without the tuner 210 and the demodulating unit 220.

The tuner 210 may select an RF (radio frequency) broadcast signal corresponding to a user-selected channel from RF broadcast signals received via an antenna or RF broadcast signals corresponding to all previously stored channels. The demodulating unit 220 may receive a digital IF (DIF) signal converted by the tuner 210 and may then perform demodulation on the received signal.

A stream signal outputted from the demodulating unit 220 may be inputted to the control unit 270. The controller 270 may perform demultiplexing, video/audio signal processing and the like and then outputs a video and an audio to the display unit 280 and the audio output unit 285, respectively.

The external device interface unit 235 may be able to connect and external device and the display apparatus 200 to each other. For this, the external device interface unit 235 may be able to include an A/V input/output unit (not shown in the drawing) or a wireless communication unit (not shown in the drawing).

The external device interface unit 235 may be connected by wire/wireless to such an external device as a DVD (digital versatile disk) player, a BD (blu-ray disk) player, a game player, a camera, a camcorder, a computer, a laptop and the like. And, the external device interface unit 235 may receive an application or an application list in an adjacent external device and may be then able to forward the received application or the received application list to the control unit 270 or the storage unit 240.

For an access to a wire network, the network interface unit 230 may include an Ethernet terminal for example. For an access to a wireless network, the network interface unit 230 may be able to use such a communication standard as WLAN (wireless LAN) (Wi-Fi), Wibro (wireless broadband), Wimax (world interoperability for microwave access), HSPDA (high speed downlink packet access) and the like. The network interface unit 230 may receive a desired application by selecting the desired application from applications open in the air via a network.

The storage unit 240 may store programs for signal processings and controls in the control unit 270 and may be also able to store a signal processed video, audio or data signal.

The storage unit 240 may perform a function for a temporary storage of a video, audio or data signal inputted from the network interface unit 230. And, the storage unit 240 may store an application or an application list inputted from the external device interface unit 235 or the network interface unit 230.

The user input interface unit 250 may forward a user-inputted signal to the control unit 270 or may forward a signal from the control unit 270 to a user. For instance, the user input interface unit 250 may process control signals for power on/off, channel selection, screen setting and the like by receiving the control signals from a remote controller 201 by such a communication system as RF (radio frequency) communication, IR (infrared) communication and the like or may be able to process the control signal from the control unit 270 to be transmitted to the remote controller 201.

The display unit 280 may generate a drive signal by converting video, data and OSD signals processed by the control unit 270 or video and data signals received from the external device interface unit 235 to R, G and B signals, respectively. The display unit 280 may include one of a PDP, an LCD, an OLED, a flexible display, a 3D display and the like.

The audio output unit 285 may receive an input of such a signal processed by the control unit 270 as a stereo signal, a 3.1 channel signal and a 5.1 channel signal and may then output the inputted signal as an audio. And, the audio output unit 285 may be implemented with various kinds of speakers.

The power supply unit 290 may supply a corresponding power to the display device 200 overall. For instance, the power supply unit 290 may be able to supply a power to each of the control unit 270 implemented as SOC (system on chip), the display unit 280 for display an image and the audio output unit 285 for an audio output.

The remote controller 201 may transmit a user input to the user input interface unit 250. For this, the remote controller 201 may be able to use such a communication standard as Bluetooth, RF (radio frequency) communication, IR (infrared) communication, UWB (ultra wideband), Zigbee and the like. Specifically, the remote controller 201 may be further described in detail with reference to FIG. 8 and FIG. 9 later.

In the following description, the display apparatus 200 for performing the channel guide function is explained. First of all, the storage unit 240 may be designed to store a program information (e.g., thumbnail image data, title outputted on EPG, etc.) corresponding to each of at least one or more channels. Yet, 2 kinds of embodiments for extracting the thumbnail image data may be proposed as follows. First of all, a $1^{st}$ embodiment may relate to a method of capturing and extracting thumbnail image data of each channel by having the control unit 270 control the tuner 210. Secondly, a $2^{nd}$ embodiment may relate to a method of designing thumbnail image data of all channels to be collectively received from an external server by having the control unit 270 control the network interface unit 230.

In particular, the network interface unit 230 may be designed to receive SNS (social network service) related side information from an externally situated server. For instance, the network interface unit 230 may receive channel status information corresponding to a user of the display apparatus 200 and each of at last one user registered as a partner (e.g., friend, etc.) of a specific SNS. In more particular, for instance, the channel status information may contain at least one of a $1^{st}$ information indicating the number of recommendations for a specific channel, a $2^{nd}$ information indicating the number of reply messages for the specific channel, and a $3^{rd}$ information indicating the number of users watching the specific channel.

The control unit 270 may save the SNS related side information received via the network interface unit 230 in the storage unit 240. In particular, a module responsible for such a function may be named a memory controller.

The user interface unit 250 may be designed to receive a command signal for executing a channel guide screen. And, the user interface unit 250 may be controlled by the remote controller 201 for example.

The control unit 270 may extract the program information (e.g., the thumbnail image data, the title outputted on the EPG, etc.) and the SNS related side information from the storage unit 240. In this case, a module responsible for such a function may be named a detector.

The control unit 270 may be designed to generate a channel guide OSD in accordance with the extracted program information (e.g., the thumbnail image data, the title outputted on the EPG, etc.) and the extracted SNS related side information.

In this case, a module responsible for such a function may be named an OSG generating module. Specifically, the OSD generating module (or an OSD generator) may be described in detail with reference to FIG. 3 later.

The display module 280 may output the channel guide OSD generated by the OSD generating module. According to another embodiment, the display module 280 may display a thumbnail image data corresponding to a specific channel on a $1^{st}$ region of the channel guide screen and may also display $1^{st}$ to $3^{rd}$ informations of the specific channel on a $2^{nd}$ region of the channel guide screen.

Moreover, if the user interface module 250 receives a command for selecting the $1^{st}$ region, the display module 280 may display a broadcast screen switched to the specific channel. This may be described in detail with reference to FIG. 13 later.

Meanwhile, if the user interface module 250 receives a command for selecting the $2^{nd}$ region, the display module 280 may be designed to simultaneously display both of the broadcast screen switched to the specific channel and an SNS executed screen. This may be described in detail with reference to FIG. 14 later.

Figure 3:
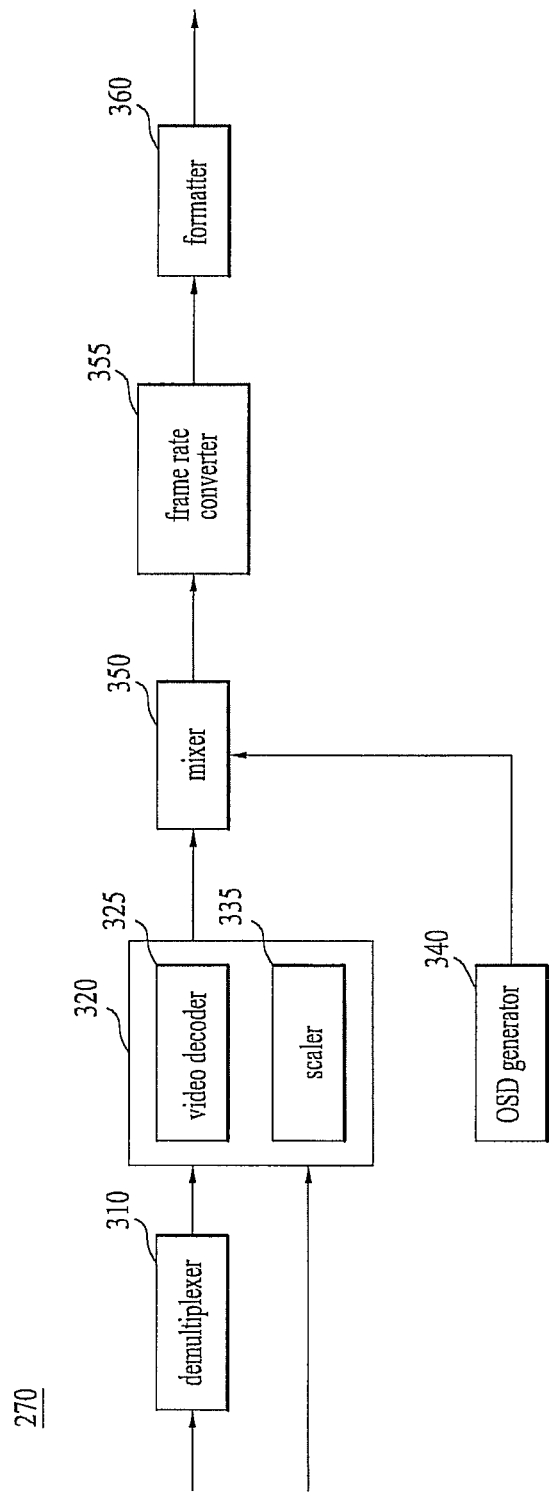
FIG. 3 shows a control unit that may be included in the display apparatus.

FIG. 3 is a detailed block diagram of modules of a control unit shown in FIG. 2. Referring to FIG. 3, the control unit 270 according to one embodiment may include a demultiplexer 310, a video processing unit 320, an OSD generator 340, a mixer 350, a frame rate converter 355 and a formatter 360. And, the control unit 270 may be able to further include an audio processing unit (not shown in the drawing) and a data processing unit (not shown in the drawing).

The demultiplexer 310 may demultiplex an inputted stream and the video processing unit 320 may perform a video processing on the demultiplexed video signal. Hence, the video processing unit 320 may further include a video decoder 325 and a scaler 335.

The video decoder 325 may decode the demultiplexed video signal and the scaler 335 may perform scaling to enable resolution of the decoded video signal to be outputtable from the display unit 180. Meanwhile, the video signal decoded by the video processing unit 320 may be inputted to the mixer 350.

The OSD generator 340 may generate an OSD signal from itself or in accordance with a user input. For instance, based on the control signal from the user input interface unit 150, the OSD generator 340 may be able to generate a signal for displaying various kinds of information as graphics or text on a screen of display unit 180.

For instance, the OSD generator 340 may generate a signal for displaying a caption of a broadcast video or a broadcast information based on EPG. According to one embodiment, the OSD generator 340 may generate an OSD for displaying SNS information on a sub-region in case of executing a channel guide or a channel browsing.

The mixer 350 may mix the OSD signal generated from the OSD generator 340 and the decoded video signal video-processed by the video processing unit 220 together. The mixed signal may be then provided to the formatter 360. As the decoded broadcast video signal or the external input signal and the OSD signal are mixed together, the corresponding OSD may be displayed in a manner of being overlaid over the broadcast video or the external input video.

The frame rate converter (FRC) 355 may be able to convert a frame rate of an inputted video. For instance, the frame rate converter 355 may convert a frame rate from 60 Hz to 120 or 240 Hz. In case of converting the frame rate from 60 Hz to 120 Hz, a $1^{st}$ frame or a $3^{rd}$ frame predicted from the $1^{st}$ frame and a $2^{nd}$ frame may be inserted between the $1^{st}$ frame and the $2^{nd}$ frame. In case of converting the frame rate from 60 Hz to 240 Hz, 3 same frames or 3 predicted frames may be further inserted therein. Besides, it may be able to maintain the inputted frame rate without separate conversion.

The formatter 360 receives an output signal from the frame rate converter 355, changes a format of the signal to fit the display unit 180, and then outputs the format changed signal. For instance, the formatter 360 may output R, G and B data signals. In particular, the R, G and B data signals can be outputted as low voltage differential signaling (LVDS) or mini-LVDS.

Meanwhile, an embodiment for the OSD generator 340 shown in FIG. 3 to generate the OSD indicating the SNS related side information may be described with reference to FIGS. 10 to 14 later.

Figure 4:
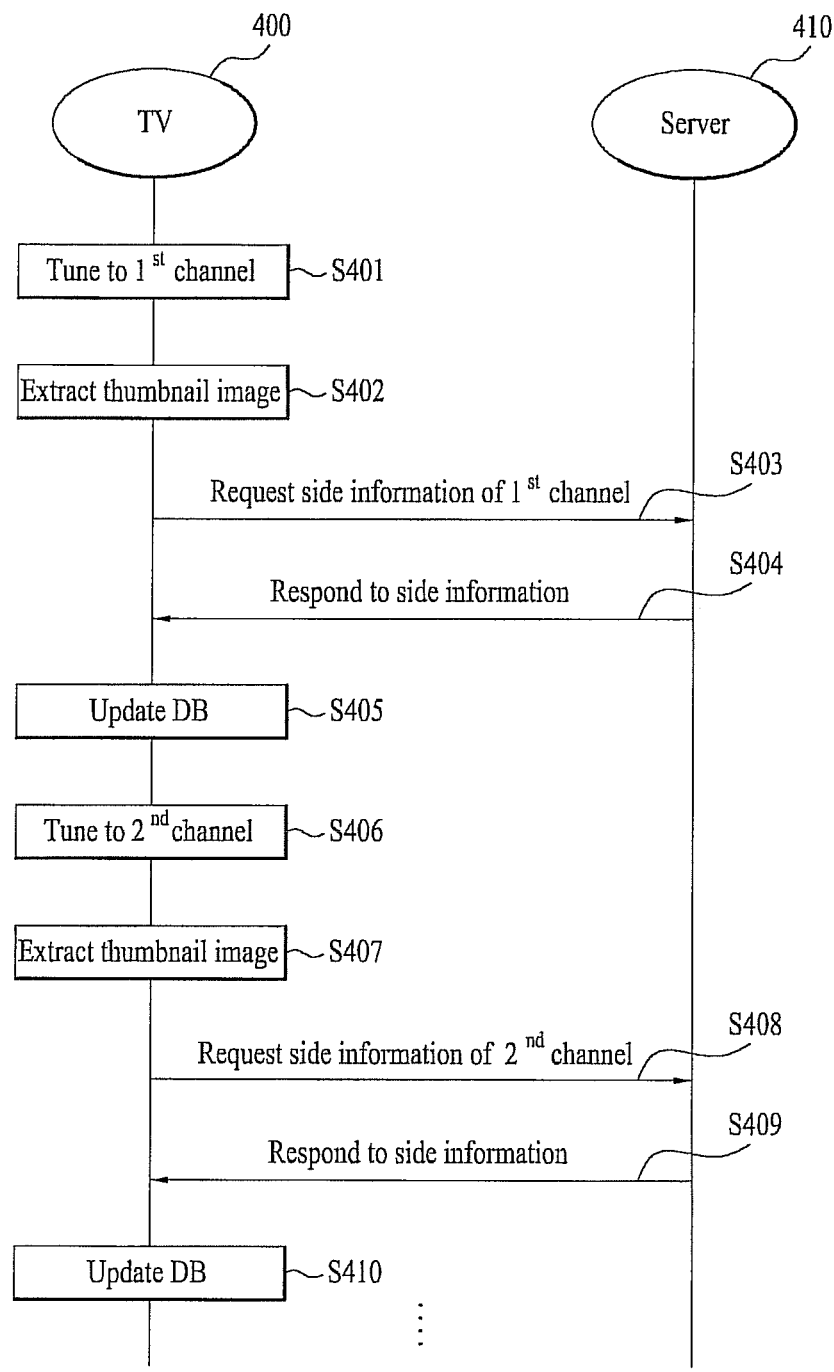
FIG. 4 shows an example of a data transport protocol that may be used between a server and a display apparatus for providing a channel guide function.

FIG. 4 is a flowchart of one embodiment of a data transport protocol between a server and a display apparatus for providing a channel guide function. In particular, one embodiment scans channels received through a tuner to obtain thumbnail image data for programs currently broadcasted on the channels. In other embodiments, information different from thumbnail images indicative of program information may be used including but not limited to textual descriptions, graphical descriptions, or a combination thereof.

Referring to FIG. 4, a display apparatus 400 (e.g., TV) for performing a channel guide function may be tuned to a $1^{st}$ channel among a plurality of channels existing in a channel list [S401]. Thumbnail image data may be extracted from the tuned $1^{st}$ channel [S402]. For instance, the step S402 may adopt a manner of capturing video data of a broadcast.

The display apparatus 400 transmits a signal for requesting side information of the tuned $1^{st}$ channel to a server 410 [S403]. For instance, the side information may correspond to SNS related data.

In response to the step S403, the server 410 may transmit the side information of the $1^{st}$ channel to the display apparatus 400 [S404]. In particular, the data transmitted in the step S404 may correspond to a data format shown in FIG. 6 for example.

The display apparatus 400 may save the SNS related side information received from the server 410 in a database [S405]. In this case, the database may include a flash memory, an HDD and/or the like in the display apparatus 400 or may include a USB memory and the like connected to the display apparatus 400.

The display apparatus 400 may be tuned to a $2^{nd}$ channel among a plurality of the channels in the channel list [S406]. Thumbnail image data may be extracted from the tuned $2^{nd}$ channel [S407].

The display apparatus 400 transmits a signal for requesting side information of the tuned $2^{nd}$ channel to the server 410 [S408]. In response to the step S408, the server 410 may transmit the side information of the $2^{nd}$ channel to the display apparatus [S409].

Subsequently, the display apparatus 400 may save the SNS related side information received from the server 410 in the database [S410]. Thereafter, the steps S410 to S410 may be repeatedly performed until the above-mentioned steps are completed for all channels contained in the channel list.

FIG. 5 is a diagram for one example of a database for providing a channel guide function. First of all, in order to implement a channel guide function according to one embodiment, the server 100 shown in FIG. 1 may have the data shown in FIG. 5 saved in a database.

For example, an IP address of A user shown in FIG. 5 may correspond to an IP address of the $2^{nd}$ TV 120 shown in FIG. 1. For example, an IP address of B user shown in FIG. 5 may correspond to an IP address of the $3^{rd}$ TV 130 shown in FIG.

1. For example, an IP address of C user shown in FIG. 5 may correspond to an IP address of the 4$^{th}$ TV 140 shown in FIG. 1.

In particular, each of the A, B and C users may mean a person previously registered as a partner (e.g., friend, etc.) at a specific SNS used by the user of the 1$^{st}$ TV 110 shown in FIG. 1.

The database shown in FIG. 5 may be recorded in the 1$^{st}$ TV 110 or the server 100 shown in FIG. 1. Hence, the server 100 may be able to monitor broadcast use statuses and SNS use statuses of the TVs using the IP addresses of the TVs used by the users registered as the SNS friends, respectively.

FIG. 6 is a diagram for another example of a database for providing a channel guide function. As mentioned in the foregoing description with reference to FIG. 5, since a channel browsing server monitors statuses of TVs used by the users registered as random SNS friends, respectively, it may be able to save detailed information on each channel in a database.

For instance, regarding the users registered as SNS friends, an information (7) on a total count for recommending Channel 6-1 (SBC), an information (4) on the number of reply messages, and an information (4) of the number of SNS friends currently watching Channel 6-1 may be updated by real time.

Regarding the users registered as SNS friends, an information (3) on a total count for recommending Channel 7-1 (KBC), an information (2) on the number of reply messages, and an information (10) of the number of SNS friends currently watching Channel 7-1 may be updated by real time.

And, regarding the users registered as SNS friends, an information (4) on a total count for recommending Channel 10-1 (EBC), an information (1) on the number of reply messages, and an information (2) of the number of SNS friends currently watching Channel 10-1 may be updated by real time.

The SNS-related side information of the channels shown in FIG. 6 may be usable to rearrange the channel browsing screen in accordance with predetermined priorities. This may be described in detail with reference to FIGS. 10 to 12.

Although the embodiment using the channel unit SNS information is described with reference to FIG. 6 and the rest of the drawings, SNS related side information may be processed by a unit of a currently broadcasted program or a unit of a sub-broadcast program contained in the specific broadcast program (e.g., if the specific broadcast program is a news program, the sub-broadcast program may correspond to a specific news article) according to another embodiment.

In particular, a display apparatus according to another embodiment may be designed to save a program information corresponding to a currently received broadcast program (e.g., A drama, B drama, C news, D movie, etc.) in a memory. Moreover, via a network interface of the display apparatus, SNS (social network service) related side information may be received from a server. And, the received SNS related side information may be designed to be saved in the memory. Via a user interface of the display apparatus, if a command signal for executing a specific guide screen is received, the memory may be designed to be accessed. In this case, the specific guide screen may correspond to an OSD screen that displays SNS information related to currently received broadcast programs.

Therefore, having extracted the program information and the SNS related side information from the memory of the display apparatus, the display apparatus may control a specific guide screen to be displayed based on the extracted program information and the extracted SNS related side information. As mentioned in the foregoing description, the specific guide screen may correspond to an OSD screen that displays SNS information related to currently received broadcast programs.

According to the above-mentioned embodiment, the SNS-related information may be processed and displayed by a broadcast program unit. According to another embodiment, SNS related information may be processed and displayed by a unit of a sub-broadcast program contained in a broadcast program.

In case that a specific broadcast program is a news program, the news program may consist of a plurality of sub-broadcast programs. Since the sub-broadcast programs may include 'article information on an entertainer A', 'article information on a politician B', 'article information on stocks', 'article info nation on weather' and the like. In accordance with one embodiment, the SNS information may be collected per article.

Figure 7:
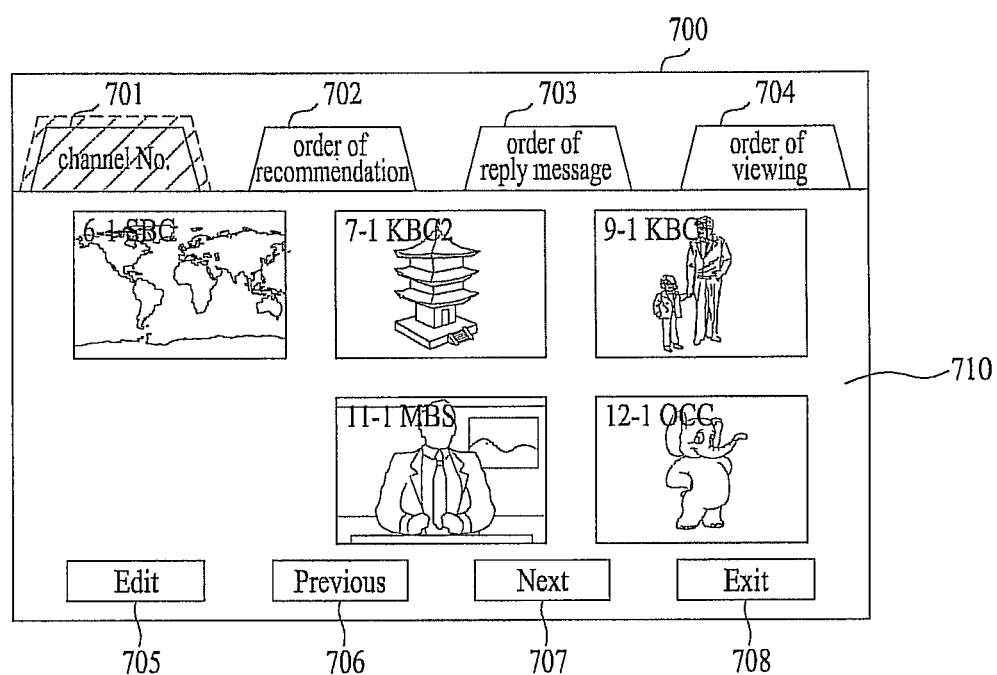
FIG. 7 shows a first on-screen display (OSD) for providing a channel guide function.

FIG. 7 is a diagram of a 1$^{st}$ OSD (on screen display) of a display apparatus for providing a channel guide function. Referring to FIG. 7, a display apparatus 700 displays a channel guide screen 710. In doing so, the channel guide screen 710 may be designed to be generated by the OSD generator shown in FIG. 3. According to one embodiment, the display apparatus 700 may add various tabs 701 to 704 for determining positions of thumbnail images of channels arranged on a channel browsing screen.

The 1$^{st}$ tab 701 may be designed to transmit a command for giving a priority to a channel number to the OSD generator.

The 2$^{nd}$ tab 702 may be designed to transmit a command for giving a priority to a count of recommendations made by users registered as friends of a specific SNS to the OSD generator.

The 3$^{rd}$ tab 703 may be designed to transmit a command for giving a priority to the number of reply messages sent by the users registered as the friends of the specific SNS to the OSD generator. And, the 4$^{th}$ tab 704 may be designed to transmit a command for giving a priority to a channel currently watched by the user(s) registered as the friend(s) of the specific SNS.

Secondly, in order to generate the command according to each of the 2$^{nd}$ tab 702, the 3$^{rd}$ tab 703 and the 4$^{th}$ tab 704, assume that the database shown in FIG. 6 is provided to the display apparatus 700. The database shown in FIG. 6 may be transmitted to the display apparatus 700 from an external server.

Meanwhile, an option 'Edit' 705 may correspond to a function for a user to arbitrarily adjust a position of a thumbnail image displayed on the channel guide screen 710 shown in FIG. 7. An option 'Previous' 706 may correspond to a function of changing a group of channels 6-1, 7-1, 9-1, 10-1, 11-1 and 12-1 arranged on the channel guide screen 710 shown in FIG. 7 into a 2$^{nd}$ channel group of channels 1-1, 1-2, 2-1, 3-1, 4-1 and 5-1.

An option 'Next' 707 may correspond to a function of changing a group of channels 6-1, 7-1, 9-1, 10-1, 11-1 and 12-1 arranged on the channel guide screen 710 shown in FIG. 7 into a 3$^{rd}$ channel group of channels 13-1, 14-1, 15-1, 16-1, 17-1 and 18-1. And, an option 'Exit' 708 may correspond to a function of re-displaying a normal broadcast screen instead of the channel guide screen 710 shown in FIG. 7.

Meanwhile, the 1$^{st}$ to 4$^{th}$ tabs 701 to 704 and the various options 705 to 708 are selectable by a remote controller, which may be described with reference to FIG. 8 and FIG. 9 as follows.

Figure 8:
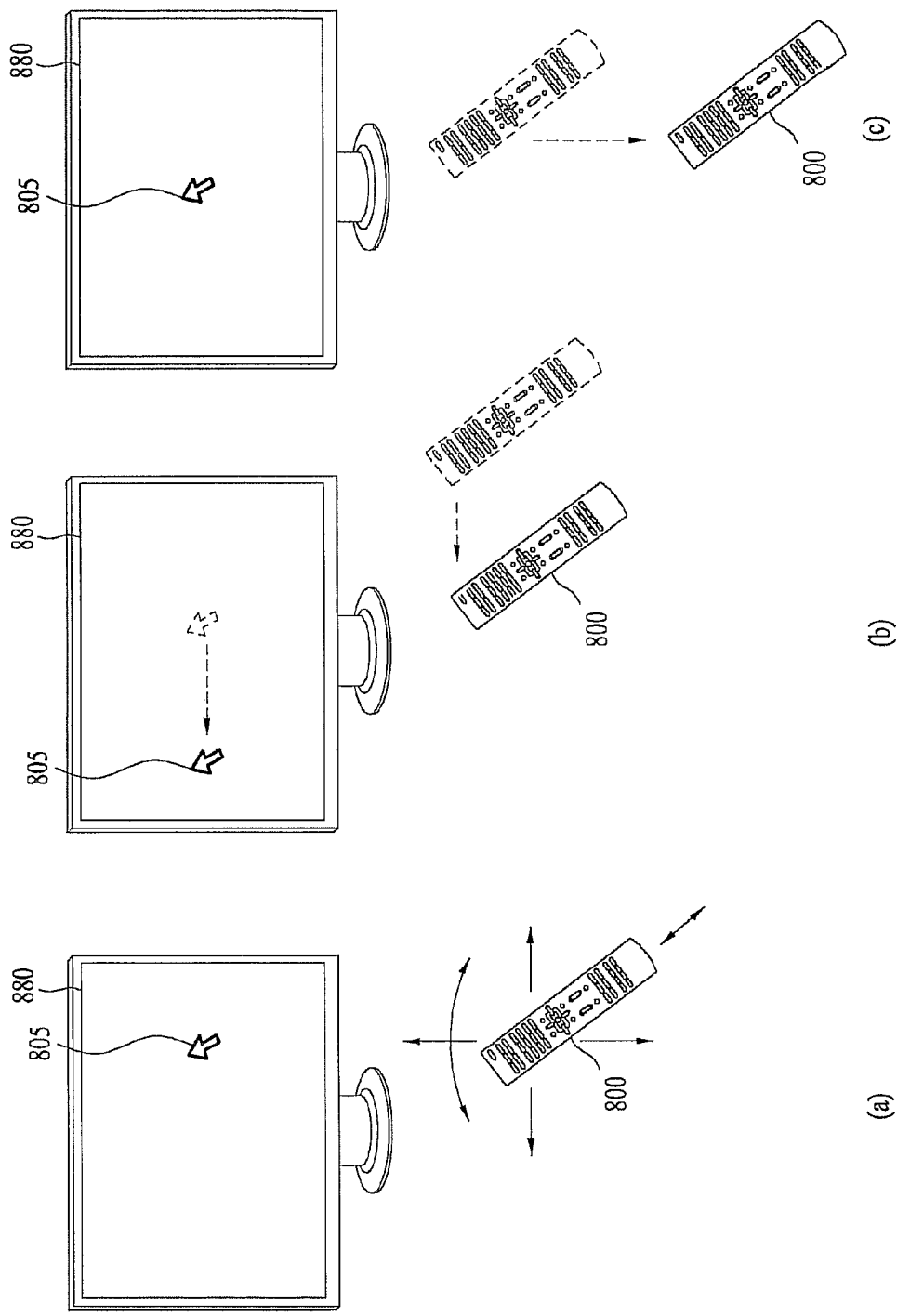
FIG. 8 shows an exterior of one type of remote controller for controlling a display apparatus that provides a channel guide function.

FIG. 8 shows an example of an exterior of a remote controller for controlling a display apparatus for providing a channel guide function. Referring to FIG. 8(a), a pointer 805 corresponding to a remote controller 800 may be displayed on a display unit 880. In particular, the display unit 880 may correspond to the display module of the device shown in FIG. 2.

A user may shift or turn the remote controller 800 up & down, side to side [FIG. 8 (b)], or back and forth [FIG. 8 (c)]. A pointer 805 displayed on the display unit 880 of the display apparatus may correspond to a motion of the remote controller 800. Since the corresponding pointer 805 is displayed in a manner of being shifted in accordance with a motion in a 3D space, as shown in the drawing, the remote controller 800 may be named a space remote controller.

Referring to FIG. 8(b), if a user shifts the remote controller 800 to the left, the pointer 805 displayed on the display unit 880 of the display apparatus may be shifted to the left to correspond to the shift of the remote controller 800.

Information on the motion of the remote controller 800 detected via a sensor of the remote controller 800 may be transmitted to the display apparatus. The display apparatus may be able to calculate coordinates of the pointer 805 from the information on the motion of the remote controller 800. And, the display apparatus may be able to display the pointer 805 to correspond to the calculated coordinates.

Referring to FIG. 8(c), while a specific button in the remote controller 800 is pressed, a user may shift the remote controller 800 to get away from the display unit 880. If so, a selected region within the display unit 880 corresponding to the pointer 805 may be displayed in a manner of being enlarged by zoom-in. On the contrary, if a user shifts the remote controller 800 to get closer to the display unit 880. a selected region within the display unit 880 corresponding to the pointer 805 may be displayed in a manner of being reduced by zoom-out.

Therefore, if the remote controller shown in FIG. 8 is used, it may be able to quickly select a specific tab, an option and/or the like from the channel guide screen shown in one of FIG. 7 and FIGS. 10 to 14.

Figure 9:
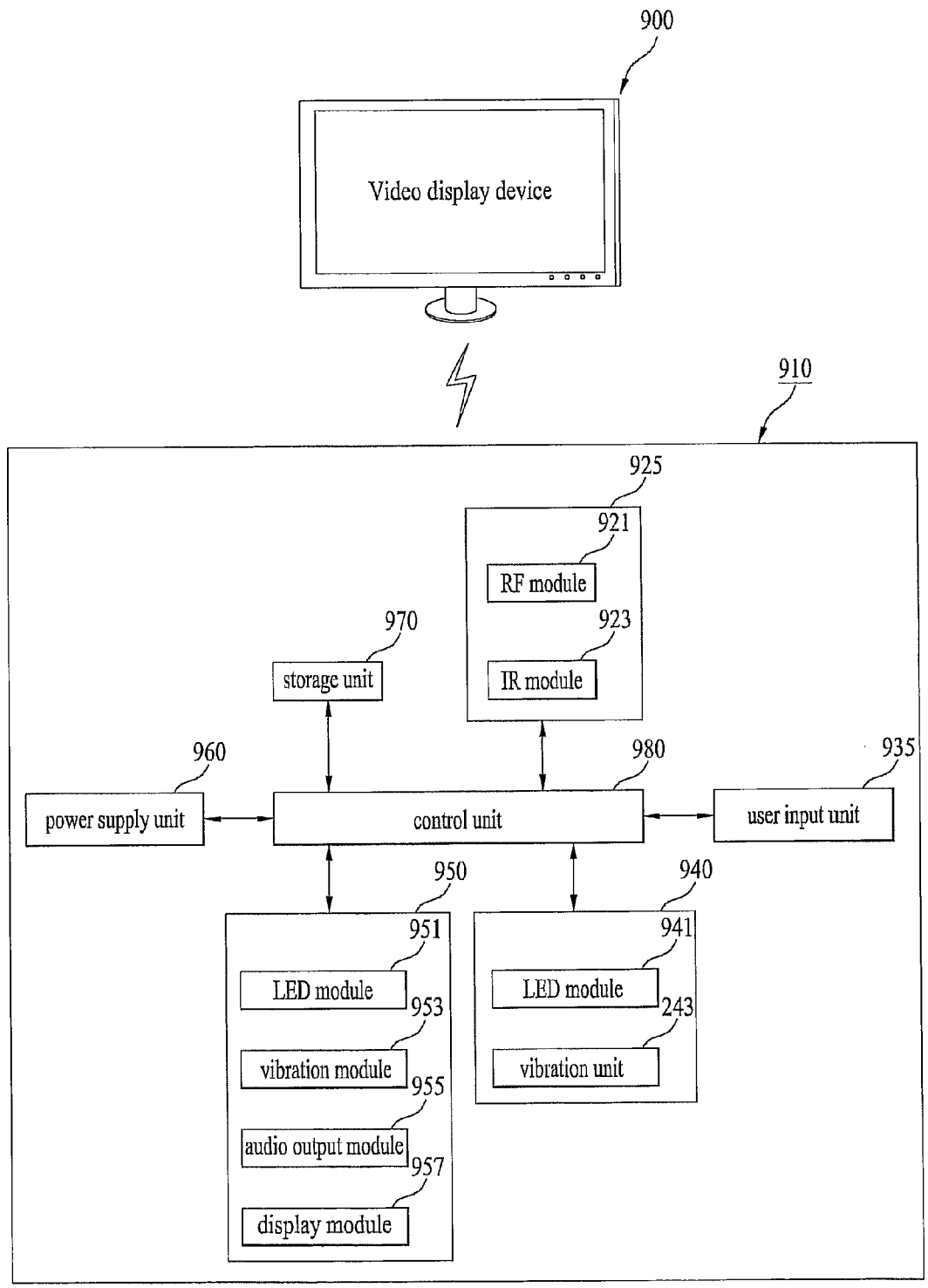
FIG. 9 shows examples of modules of the remote controller.

FIG. 9 is a detailed diagram of modules which may be included in the remote controller in FIG. 8. Referring to FIG. 9, according to one embodiment, a remote controller 910 may include a wireless communication unit 925, a user input unit 935, a sensor unit 940, an output unit 950, a power supply unit 960, a storage unit 970 and a control unit 980.

The wireless communication unit 925 may transmit/receive signals to/from a prescribed one of the display apparatuses.

According to one embodiment, remote controller 910 may be provided with an RF module 921 capable of transceiving signals with the display apparatus 900 in accordance with the RF communication standard. Moreover, the remote controller 910 may be provided with an IR module 923 capable of transceiving signals with the display apparatus 900 in accordance with the IR communication standard.

According to this embodiment, the remote controller 910 may transmit a signal containing information on a motion of the remote controller 910 and the like via the RF module 921. The remote controller 910 may receive a signal transmitted by the display apparatus 900 via the RF module 921. If necessary, the remote controller 900 may transmit a command for a power-on/off, a channel switching, a volume adjustment or the like to the display apparatus 900 via the IR module 923.

The user input unit 935 may include at least one of a keypad, a button, a touchpad, a touchscreen and the like. A user may input a command related to the display apparatus 900 to the remote controller 910 by manipulating the user input unit 935. The sensor unit 940 may include a gyro sensor 941 or an acceleration sensor 943.

For instance, the gyro sensor 941 may be able to sense information on a motion of the remote controller 910 with reference to x-axis, y-axis and z-axis. The acceleration sensor 943 may be able to sense information on a moving speed of the remote controller 910 and the like, by which a distance from the display apparatus 900 may be sensed.

The output unit 950 may output a video or audio signal corresponding to a manipulation of the user input unit 935 or a signal transmitted by the display apparatus 900. A user may be able to recognize a presence or non-presence of the manipulation of the user input unit 935 or a presence or non-presence of the control of the display apparatus 900 via the output unit 950.

For instance, the output unit 950 may include an LED module 951 turned on if the user input unit 935 is manipulated or a signal is transceived with the display apparatus 900 via the wireless communication unit 925. For another instance, the output unit 950 may include a vibration module 953 generating vibration if the user input unit 935 is manipulated or a signal is transceived with the display apparatus 900 via the wireless communication unit 925. For another instance, the output unit 950 may include an audio output module 955 outputting an audio if the user input unit 935 is manipulated or a signal is transceived with the display apparatus 900 via the wireless communication unit 925. For another instance, the output unit 950 may include a display module 957 outputting a video if the user input unit 935 is manipulated or a signal is transceived with the display apparatus 900 via the wireless communication unit 925.

The power supply unit 960 may supply a power to the remote controller 910. The power supply unit 960 may be able to reduce waste of power by interrupting the power supply if the remote controller 910 does not move for prescribed duration. The power supply unit 960 may be able to restart the power supply if a prescribed key provided to the remote controller 910 is manipulated.

The storage unit 970 may store various kinds of programs, application data and the like required for controlling or operating the remote controller 910. When the remote controller 910 transceives signals by wireless with the display apparatus 900 via the RF module 921, the remote controller 910 and the display apparatus 900 may transceive signals with each other on a prescribed frequency band.

The control unit 980 may control overall items related to the control of the remote controller 980. The control unit 980 may transmit a signal corresponding to a prescribed key manipulation of the user input unit 935 or a signal corresponding to a motion of the remote controller 910 sensed by the sensor unit 940 to the display apparatus 900 via the wireless communication unit 925.

In particular, the control unit 980 may be designed to transmit a command signal for selecting one of various tabs and options displayed on the channel guide related OSD screen to the display apparatus 900 by controlling one of the RF module 921, the IR module 923 and the like. As mentioned in the foregoing description, since the control unit 980 transmits the command in accordance with the motion of the remote controller 910, one of adjacent regions may be correctly selected.

Figure 10:
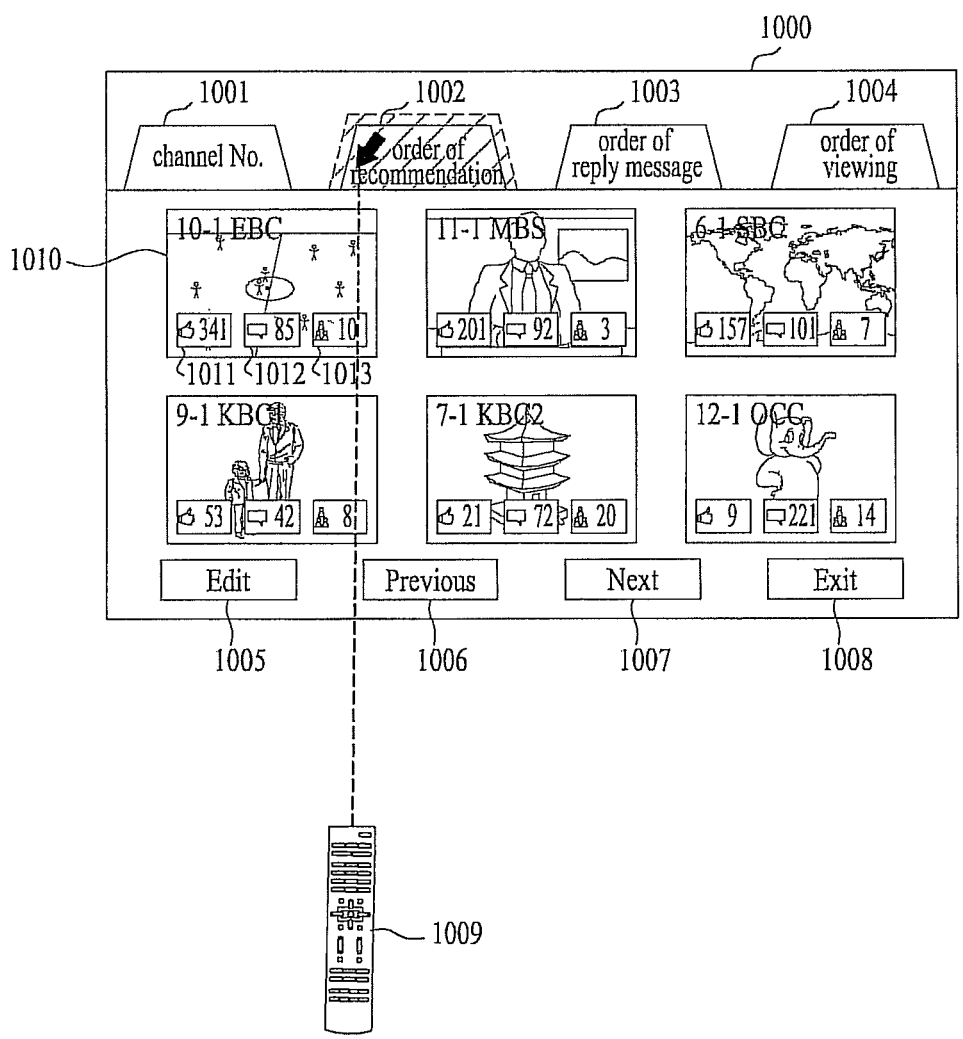
FIG. 10 shows a second OSD for providing a channel guide function.

FIG. 10 is a diagram of a $2^{nd}$ OSD of a display apparatus 1000 for providing a channel guide function. The remote controller 1009 in FIG. 10 may have the same configuration of the remote controller in either of FIG. 8 and FIG. 9, or a different remote controller may be used.

Comparing FIG. 10 to FIG. 7, FIG. 10 assumes that a tab 'order of recommendation' 1002 is selected using the remote controller 1009. And, thumbnail image data corresponding to a plurality of channels are displayed in a manner of being changed in order. Moreover, the same description as explained with reference to FIG. 7 may be omitted in the following. And, it may be apparent to those skilled in the art that FIG. 10 is understandable with reference to FIG. 7.

As mentioned in the foregoing description, the display apparatus 1000 according to one embodiment may be designed to receive SNS related information from an external server. Specifically, the display apparatus 1000 according to one embodiment may numerically represent the SNS related information as well as a representative thumbnail image data 1010 of each channel.

First of all, a $1^{st}$ subregion 1011 displayed together with the representative thumbnail image data 1010 may indicate information on a count of recommendations, which may be made by users registered as friends of a specific SNS, for a corresponding channel. And, a $2^{nd}$ subregion 1012 displayed together with the representative thumbnail image data 1010 may indicate the number of reply messages recorded by the users registered as the friends of the specific SNS.

Moreover, a $3^{rd}$ subregion 1013 displayed together with the representative thumbnail image data 1010 may indicate the number of persons currently watching the corresponding channel among the users registered as the friends of the specific SNS.

Therefore, a user, who is using an enhanced channel browser screen shown in FIG. 10, may have the advantage in selecting a popular channel in consideration of a trend or tendency of friends using the SNS related information instead of merely selecting a specific channel with a channel number. And, the $1^{st}$ to $3^{rd}$ subregions 1011 to 1013 may be designed to be updated by real time for communication with a server.

Besides, FIG. 10 shows that the channel guide screen is displayed in order of channels 10-1, 11-1, 6-1, 9-1, 7-1 and 12-1. This is because the numerals displayed on the $1^{st}$ subregion of each channel are determined with reference to priority.

Figure 11:
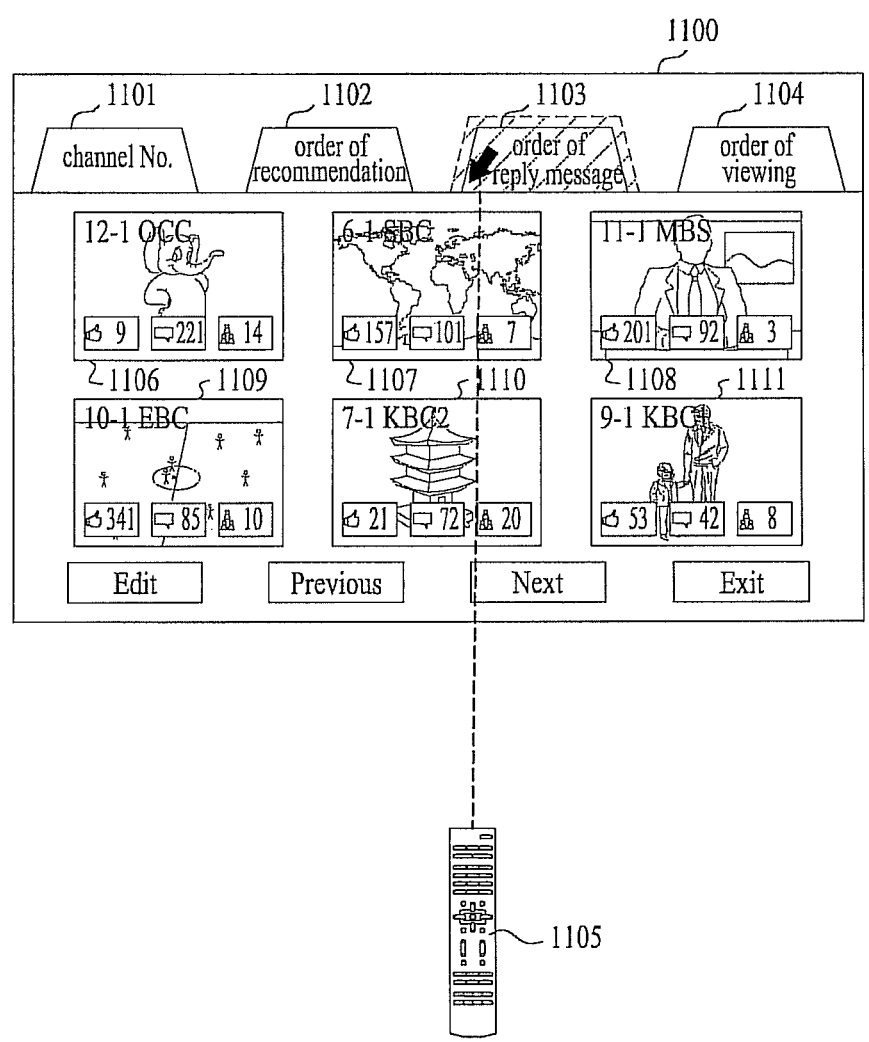
FIG. 11 shows a third OSD for providing a channel guide function.

FIG. 11 is a diagram of a $3^{rd}$ OSD of a display apparatus for providing a channel guide function. The remote controller 1105 in FIG. 11 may have the same configuration of the remote controller in FIG. 8 or 9, or a different remote controller may be used.

Comparing FIG. 11 to FIG. 10, FIG. 11 assumes that a tab 'order of reply message' 1103 is selected using the remote controller 1105. And, thumbnail image data corresponding to a plurality of channels are displayed in a manner of being changed in order. Moreover, the same description as explained with reference to FIG. 10 may be omitted in the following. And, it may be apparent to those skilled in the art that FIG. 11 is understandable with reference to FIG. 10.

The display apparatus 1100 according to one embodiment may numerically represent the SNS related information as well as a representative thumbnail image data of each channel. And, the aforesaid $2^{nd}$ subregion may indicate the number of reply messages recorded by the users registered as the friends of the specific SNS.

Therefore, the channel guide screen may be changed in order from a channel having the greatest number of reply messages to a channel having the smallest number of reply messages (i.e., in order of Channel 12-1, Channel 6-1, Channel 11-1, Channel 10-1, Channel 7-1 and Channel 9-1 in FIG. 11). This is because the numerals displayed on the $2^{nd}$ subregion of each channel are determined with reference to priority.

Figure 12:
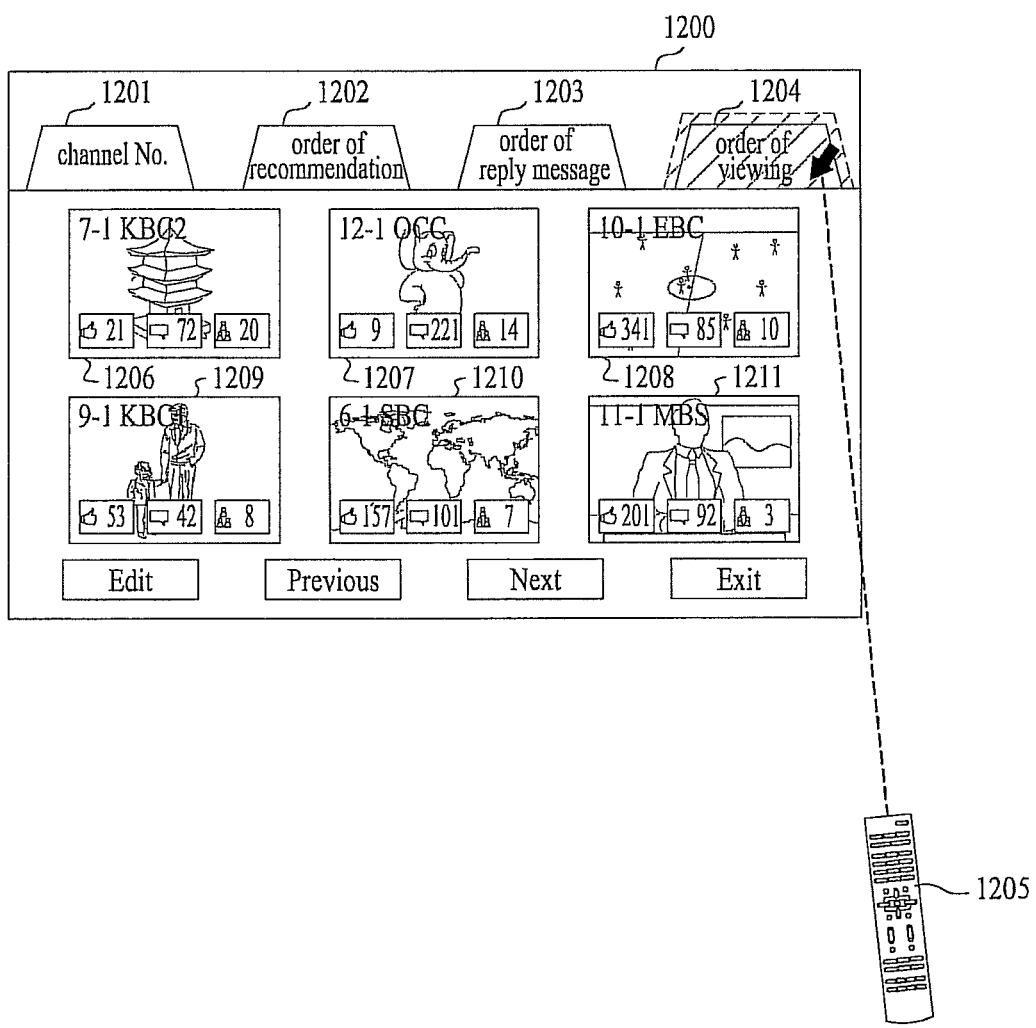
FIG. 12 shows a fourth OSD for providing a channel guide function.

FIG. 12 is a diagram of a $4^{th}$ OSD of a display apparatus for providing a channel guide function. The remote controller 1205 in FIG. 12 may have the same configuration of the remote controller in FIG. 8 or 9, or a different remote controller may be used.

Comparing FIG. 12 to FIG. 10, FIG. 12 assumes that a tab 'order of viewing' 1204 is selected using the remote controller 1205. And, thumbnail image data corresponding to a plurality of channels are displayed in a manner of being changed in order. Moreover, the same description as explained with reference to FIG. 10 may be omitted in the following. And, it may be apparent to those skilled in the art that FIG. 12 is understandable with reference to FIG. 10.

The display apparatus 1200 may numerically represent the SNS related information as well as a representative thumbnail image data of each channel. And, the aforesaid $3^{rd}$ subregion may indicate the number of SNS friends currently watching the corresponding channel among the users registered as the friends of the specific SNS.

Therefore, the channel guide screen may be changed in order from a channel currently watched by the greatest number of SNS friends to a channel currently watched by the smallest number of SNS friends (i.e., in order of Channel 7-1, Channel 12-1, Channel 10-1, Channel 9-1, Channel 6-1 and Channel 11-1 in FIG. 12). This is because the numerals displayed on the $3^{rd}$ subregion of each channel are determined with reference to priority.

Figure 13:
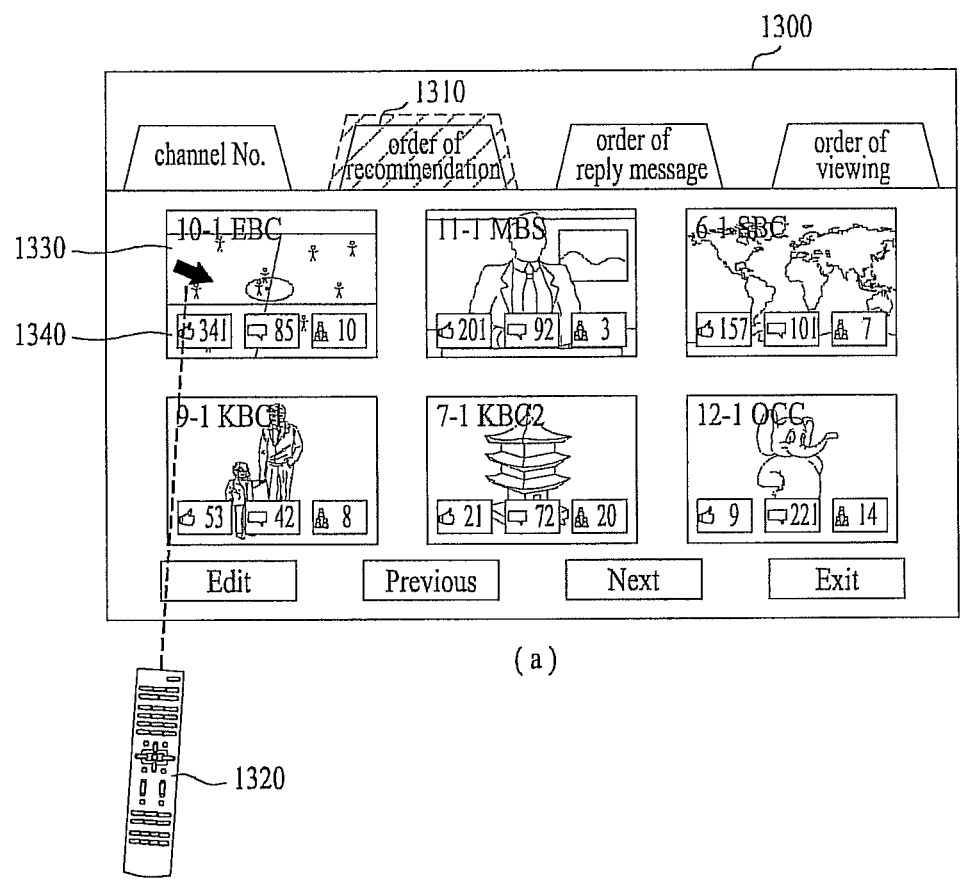
FIG. 13 shows a screen changed in accordance with a 1st user interface of a display apparatus for providing a channel guide function.
Figure 13:
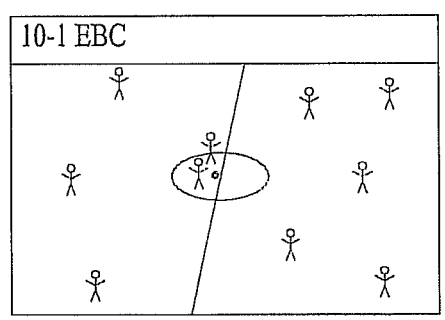

FIG. 13 shows one embodiment of a screen changed in accordance with a $1^{st}$ user interface of a display apparatus 1300 for providing a channel guide function. In this display apparatus, a tab entitled 'order of recommendation' 1310 may be selected using a remote controller 1320. More specifically, referring to FIG. 13(a), thumbnail image data of channels rearranged in order of recommendation are displayed. Moreover, a video data region for a corresponding broadcast program itself, a $1^{st}$ region 1330, an SNS related side information region and a $2^{nd}$ region 1340 may be simultaneously displayed.

It may be designed to select either the $1^{st}$ region or the $2^{nd}$ region using the remote controller 1320. If the $1^{st}$ region 1330 is selected using the remote controller 1320, referring to FIG. 13(b), it may be tuned to a corresponding channel. And, it may be designed to display a broadcast program of the tuned channel. Therefore, FIG. 13 (a) and FIG. 13 (b) show the design in consideration of the need for a user to use an SNS side information for a channel selection instead of using an SNS service simultaneously in case of switching to a selected channel.

Figure 14:
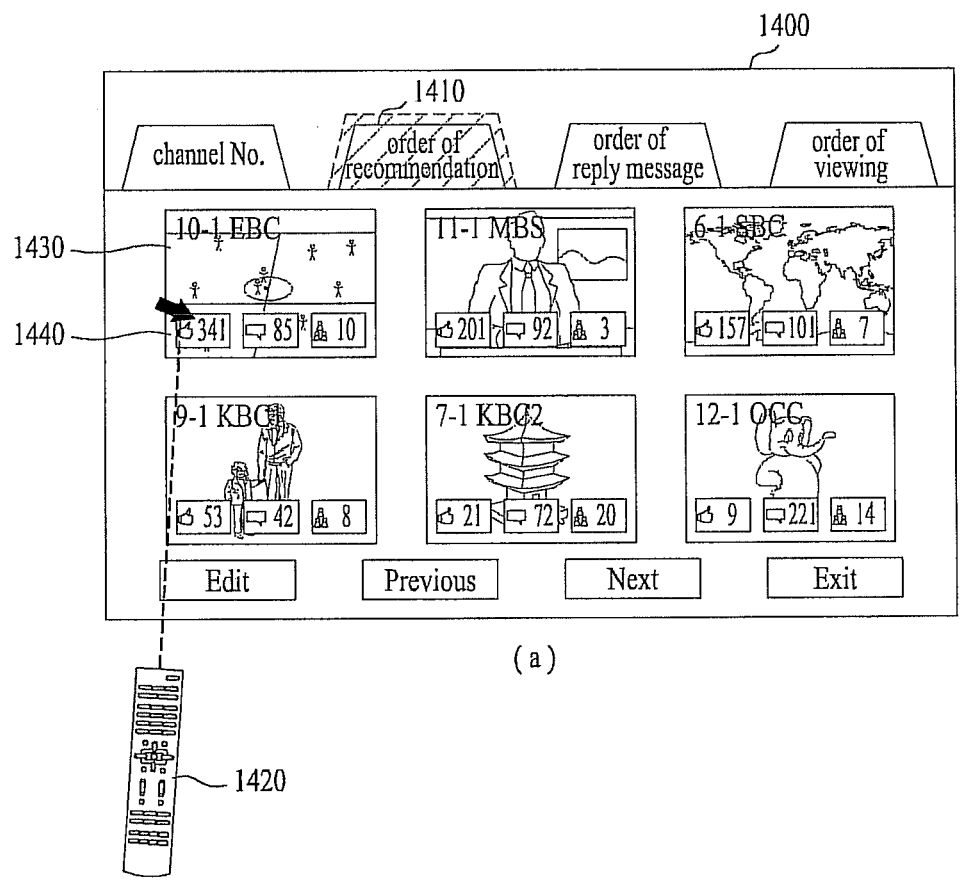
FIG. 14 shows a screen changed in accordance with a 2nd user interface of a display apparatus for providing a channel guide function.
Figure 14:
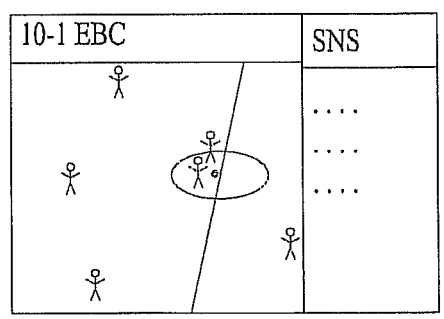

FIG. 14 shows an embodiment of a screen changed in accordance with a $2^{nd}$ user interface of a display apparatus 1400 for providing a channel guide function. N the display apparatus 1400, a tab entitled 'order of recommendation' 1410 may be selected using a remote controller 1420. Referring to FIG. 14 (a), thumbnail image data of channels rearranged in order of recommendation are displayed. Moreover, a video data region for a corresponding broadcast program itself, a $1^{st}$ region 1430, an SNS related side information region and a $2^{nd}$ region 1440 may be simultaneously displayed.

It may be designed to select either the $1^{st}$ region or the $2^{nd}$ region using the remote controller 1420. If the $2^{nd}$ region 1440 is selected using the remote controller 1420, it may be tuned to a corresponding channel. And, referring to FIG. 14 (b), it may be designed to simultaneously display a service screen related to a corresponding SNS and a broadcast program of the tuned channel.

Therefore, if a user selects a specific region, FIG. 14(a) and FIG. 14(b) show that both of a broadcast program and an SNS service are designed to be simultaneously displayed. This design may be advantageous in increasing a speed of access to each region. And, this design also beings an effect that a chat with SNS friends preferring a tuned broadcast program can be performed more instantly.

Figure 15:
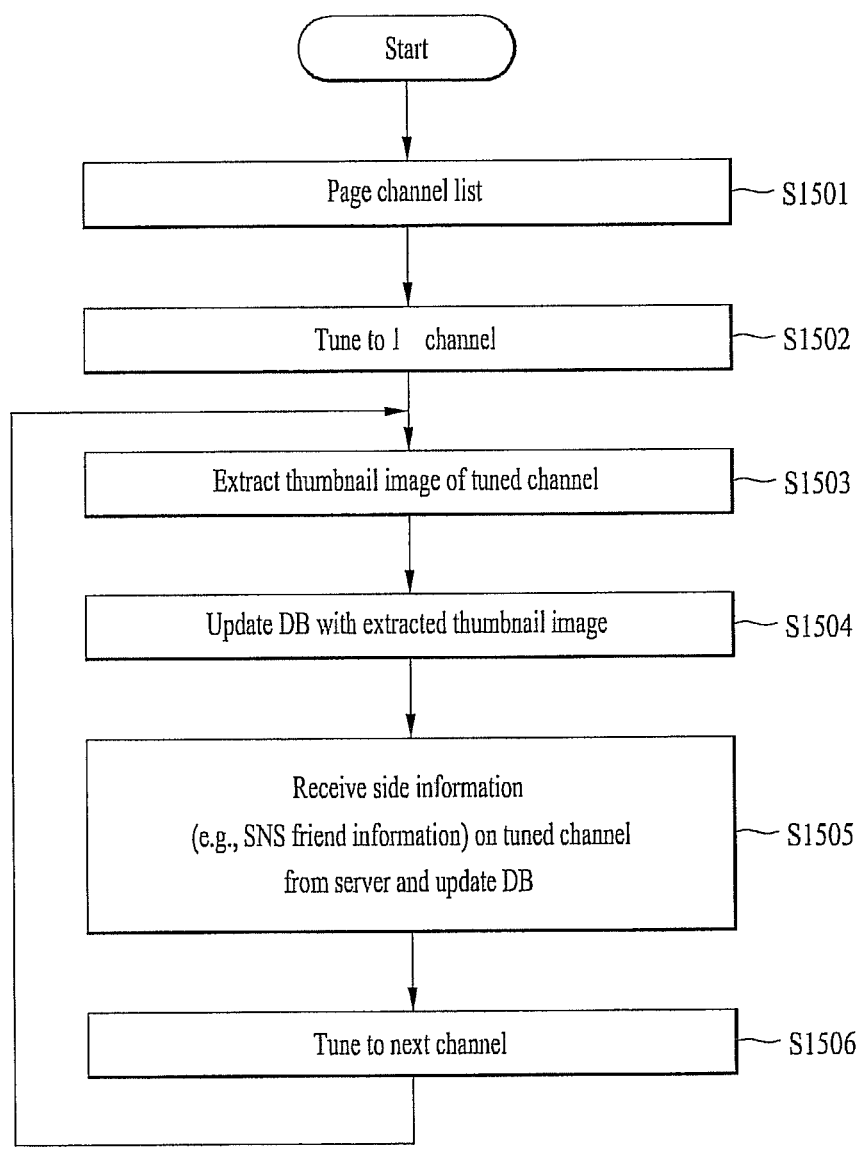
FIG. 15 shows one embodiment of a method for controlling a display apparatus for providing a channel guide function.

FIG. 15 shows an embodiment of a method of controlling a display apparatus for providing a channel guide function. In this embodiment, a process for updating SNS-related information to a DB to provide a channel guide function is explained. First of all, a display apparatus according to one embodiment pages a previously stored channel list or a channel list received from a server [S1501]. And, the display apparatus may be designed to be tuned to a $1^{st}$ channel in the paged channel list [S1502].

The display apparatus may extract thumbnail image data of the tuned Pt channel [S1503]. And, the display apparatus may save the thumbnail image data extracted in the step S1503 in a database [S1504].

The display apparatus receives side information on the tuned channel and then saves the received side information in the database [S1505]. In this case, the side information may mean a status information of a TV used by a user registered as a friend of a specific SNS or the like.

Finally, the display apparatus may be designed to be tuned to a $2^{nd}$ channel in the paged channel list [S1506]. Moreover, until tuning to all channels listed in the paged channel list is completed, it may be designed to repeat the steps S1503 to S1506.

Figure 16:
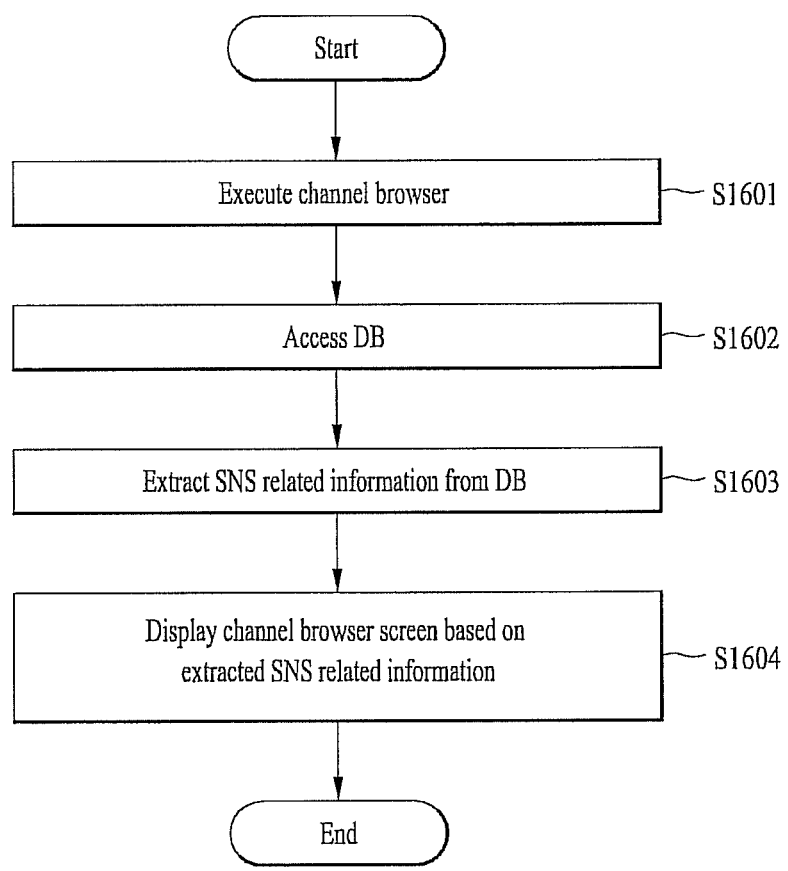
FIG. 16 shows another embodiment of a method for controlling a display apparatus for providing a channel guide function.

FIG. 16 shows another embodiment of a method of controlling a display apparatus for providing a channel guide function. In this embodiment, a process for configuring a screen in accordance with SNS-related information to provide a channel guide function is explained. Meanwhile, FIG. 16 may be designed on the assumption of FIG. 15 or FIG. 16 may be designed independently from FIG. 15.

First of all, the display apparatus may receive a command signal for executing a channel browsing or a channel guide [S1601]. The display apparatus may then access a database stored in a memory [S1601]. In this case, the database may be designed to include the data format shown in FIG. 6 for example.

The display apparatus may extract SNS related side information saved in the database [S1603]. Based on the extracted SNS related side information, the display apparatus may display a channel browsing or guide related OSD screen [S1604]. Since the step S1604 may refer to the former descriptions with reference to FIGS. 10 to 14, its redundant description may be omitted from the following description.

One or more embodiments described herein, therefore, may save program information (e.g., thumbnail image data, title outputted on EPG, etc.) corresponding to each of at least one or more channels in a memory. In doing so, 2 kinds of embodiments may be implemented.

A $1^{st}$ embodiment may be designed to include a $1^{st}$ step of tuning to a $1^{st}$ one of at least one or more channels in a channel list, a $2^{nd}$ step of detecting video data of the tuned channel and saving the detected video data in the memory, and a step of returning to the $1^{st}$ step and the $2^{nd}$ step until completing the tuning to all of the at least one or more channels in the channel list.

A $2^{nd}$ embodiment may be designed to include a step of receiving a program information (e.g., thumbnail image data, title outputted on EPG, etc.) corresponding to each of at least one or more channels from the sever via the network interface and a step of saving the received program information in the memory.

The display apparatus may receive SNS-related side information from the server via the network interface. In this case, it may be designed to receive channel status information of a display apparatus corresponding to each of at least one user registered as a partner (e.g., friend) of a specific SNS with a user of the former display apparatus. The channel status information may include at least one of a $1^{st}$ information indicating the number of recommendations for a specific channel, a $2^{nd}$ information indicating the number of reply messages for the specific channel and a $3^{rd}$ information indicating the number of users watching the specific channel.

The display apparatus may save the received SNS related side information in the memory and may receive a command signal for executing a channel guide screen via a user interface. Subsequently, the display apparatus may access the memory and may then extract the program information (e.g., thumbnail image data, title outputted on EPG, etc.) and the SNS related side information from the accessed memory. Finally, the display apparatus may control the channel guide screen to be displayed based on the extracted program information and the extracted SNS related side information.

Moreover, the controlling process may be implemented into two kinds of embodiments. A $1^{st}$ embodiment may be designed to include a step of displaying thumbnail image data corresponding to the specific channel on a $1^{st}$ region of the channel guide screen and a step of displaying $1^{st}$ to $3^{rd}$ information (cf. reference numbers '1011', '1012' and '1013' in FIG. 10) of the specific channel on a $2^{nd}$ region of the channel guide screen.

A $2^{nd}$ embodiment may be designed to include a step of giving a priority of each channel based on one of the $1^{st}$ to $3^{rd}$ information and a step of controlling a position of a thumbnail image of each channel to be arranged in accordance with the given priority. For instance, an order of a channel to be changed may be determined in accordance with a specific priority, as shown in FIGS. 10 to 12.

Moreover, by displaying SNS related information on a channel browser simultaneously, a user may be able to select a channel in accordance with various references. Also, instead of outputting a channel guide screen by depending on a channel number order according to a related art, priority-given channels may be rearranged in accordance with the SNS-related information. Also, a user interface may be provided to facilitate a switching between a broadcast screen and an SNS-related screen more quickly.

In accordance with one embodiment, the program information may contain thumbnail image data indicating a program of each channel currently broadcasted. In another embodiment, EPG (electronic program guide) function may be used as explained with reference to FIGS. 17 to 20. In this case, the aforesaid program information may include a title of a program belonging to predetermined duration of each channel, for example.

FIG. 17 is a diagram of a $1^{st}$ embodiment of a user interface. In this embodiment, a display apparatus 1700 outputs an EPG screen 1700. The EPG screen is output in a way that allows a user to select a desired broadcast program based on SNS-related information show within or displayed simultaneously with the EPG screen.

For instance, referring to FIG. 17, SNS-related side information 1711 to 1713 of a specific event (e.g., a broadcast program of a title WAR2) may be designed to be displayed on an EPG. The SNS-related side information may include 3 kinds of items simultaneously displayed. In other embodiments, a different number of SNS-related types of information may be displayed, and/or a user-specific SNS-related side information may be displayed.

Figure 18:
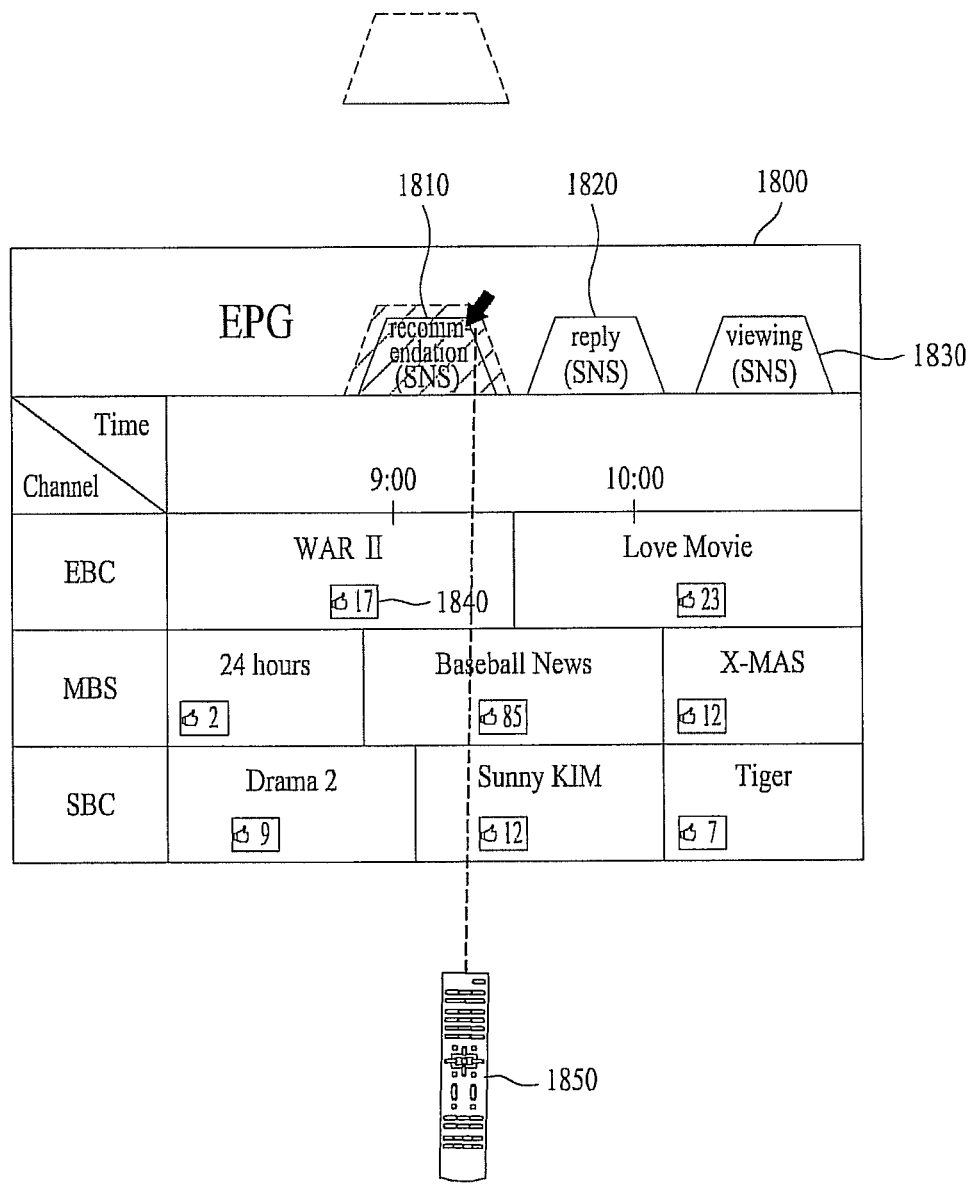
FIG. 18 shows a second embodiment of a user interface for applying one or more embodiments to an EPG.

FIG. 18 is a diagram of a $2^{nd}$ embodiment of a user interface, in which an EPG outputted by a display apparatus 1800.

Referring to FIG. 18, the display apparatus 1800 may output an EPG screen containing one or more of 3 kinds of options 1810, 1820 and 1830. The $1^{st}$ option 1810 may mean a function of displaying an SNS recommendation number of a specific event (broadcast program) on the EPG. The $2^{nd}$ option 1820 may mean a function of displaying an reply number of a specific event (broadcast program) on the EPG. And, the $3^{rd}$ option 1830 may mean a function of displaying an SNS recommendation number of SNS watching persons of a specific event (broadcast program) on the EPG.

Therefore, if an indicator having a position vary in accordance with a motion of the remote controller 1850 selects the $1^{st}$ option 1810, a title of each broadcast program displayed on the EPG and an SNS recommendation number 1840 may be designed to be displayed together.

Figure 19:
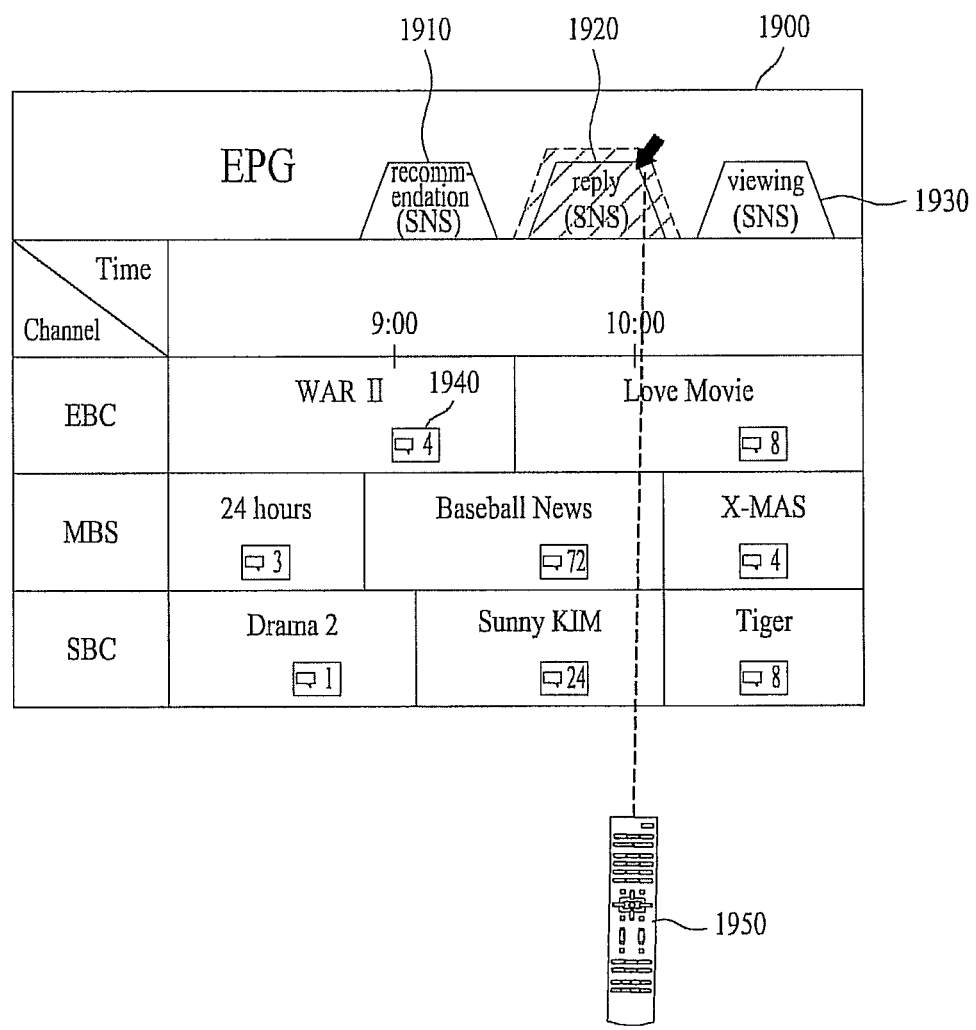
FIG. 19 shows a third embodiment of a user interface for applying one or more embodiments to an EPG.

FIG. 19 is a diagram of a $3^{rd}$ embodiment of a user interface in which an EPG outputted by a display apparatus 1900. The display apparatus may output an EPG screen containing one or more of 3 kinds of options 1910, 1920 and 1930. Therefore, if an indicator having a position vary in accordance with a motion of the remote controller 1950 selects the $2^{nd}$ option 1920, a title of each broadcast program displayed on the EPG and an SNS reply number 1940 may be designed to be displayed together.

Figure 20:
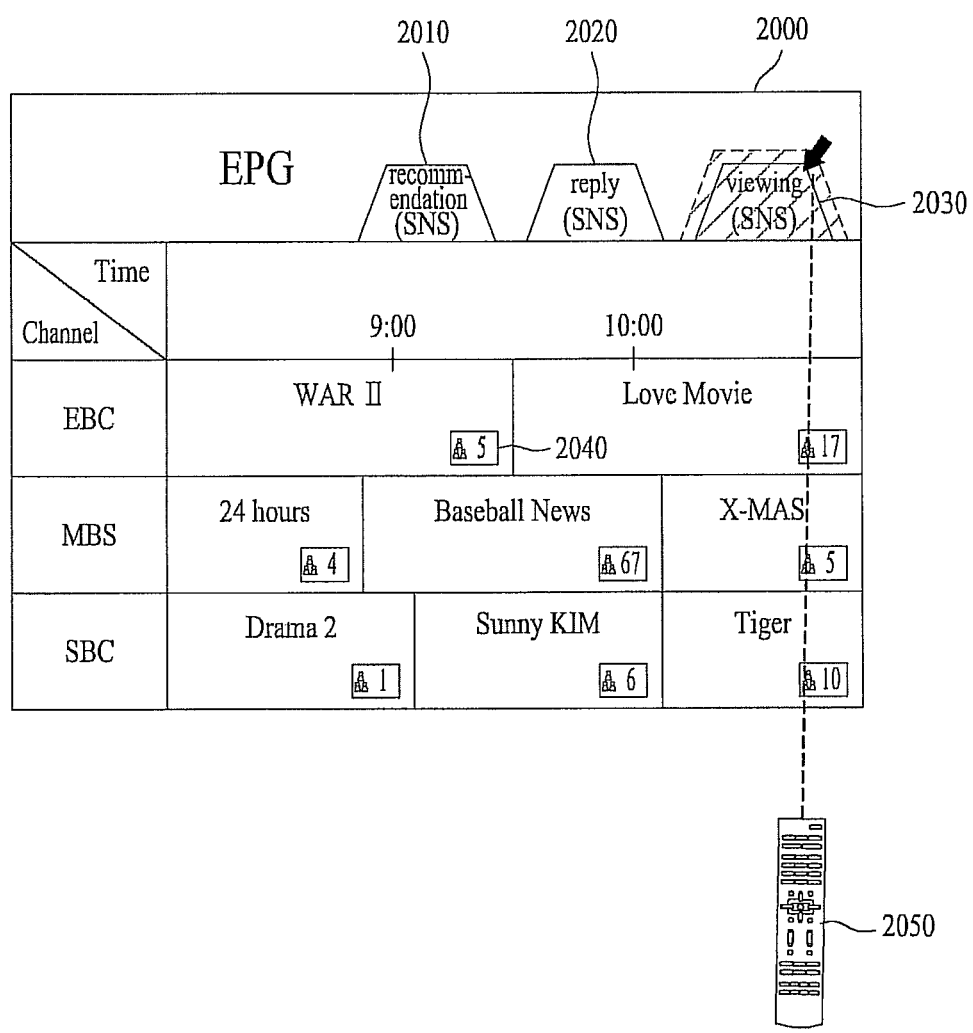
FIG. 20 shows a fourth embodiment of a user interface for applying one or more embodiments to an EPG

FIG. 20 is a diagram of a user interface according to a $4^{th}$ embodiment in which an EPG is outputted by a display apparatus 2000. In this display apparatus, an EPG screen is output containing one more of 3 kinds of options 2010, 2020 and 2030. If an indicator having a position vary in accordance with a motion of the remote controller 2050 selects the $3^{rd}$ option 2030, a title of each broadcast program displayed on the EPG and an SNS viewing person number 2040 may be designed to be displayed together. In this case, the SNS viewing person number may mean the number of users, who are registered as friends (or followers) at a specific SNS by a user of the display apparatus 2000, in the course of watching or the number of the registered users having the viewing history.

In accordance with another embodiment, a recoding medium readable by a computer, controller, or other type of processing device may include programs for executing any one or more of the above-mentioned embodiments. Such programs may include code sections for performing the operations in those embodiments. The processor-readable media may include a variety of kinds of recording mediums in which data readable by a processor are stored. Examples include ROM, RAM, CD-ROM, magnetic tapes, floppy discs, optical data storage devices, and the like for example and may also include carrier-wave type implementations (e.g., transmission via Internet). Moreover, the processor-readable recording medium may be distributed on network-connected computer systems to save and execute processor-readable codes by distributed processing.

One or more embodiments described herein, therefore, include a display apparatus for providing a channel guide screen and controlling method thereof. One or more of these embodiments may provide a viewing situation based on at least one user connected to an SNS and may provide a channel guide screen or a channel browsing screen that presents information based on SNS data from that user or other users.

Another embodiment defines a protocol for rearranging a position of a thumbnail image of each channel in accordance with a specific priority using additional data related to an SNS.

Another embodiment may provide a user interface more quickly switchable between a channel guide or browsing screen and an SNS related screen.

In accordance with one embodiment, a display apparatus for providing a channel guide screen includes a memory storing a program information corresponding to each of at least one channel, a network interface module receiving SNS (social network service) related side information from a server, a memory controller saving the received SNS related side information in the memory, a user interface module receiving a command signal for executing the channel guide screen, a detector extracting the program information and the SNS related side information from the accessed memory, an OSD generating module generating a channel guide OSD in accordance with the extracted program information and the extracted SNS related side information, and a display module outputting the channel guide OSD generated by the OSD generating module.

In accordance with another embodiment, a method of controlling a display device providing a channel guide screen includes saving a program information corresponding to each of at least one channel in a memory, receiving SNS (social network service) related side information from a server via a network interface, saving the received SNS related side information in the memory, receiving a command signal for executing the channel guide screen via a user interface, accessing the memory, extracting the program information and the SNS related side information from the accessed memory, and controlling the channel guide screen to be displayed based on the extracted program information and the extracted SNS related side information.

In accordance with another embodiment, an apparatus for a television comprises an on-screen display (OSD) generator; a first interface to receive signals for controlling a television; a first storage area to store information relating to a plurality of channels; a second interface to receive data from a social network service (SNS); a second storage area to store the SNS data; and a controller to control the OSD generator to simultaneously output for display program information of the plurality of channels, wherein the program information is output based on the stored SNS data and wherein the stored SNS data is based on a plurality of members of the social network service.

The apparatus may be included in the television or in a device coupled to the television such as but not limited to a set-top box and/or a box coupled to display internet, gaming, and/or other multimedia information. Instead of a television, this embodiment may be modified to output information on another type of display device, which may be portable or stationary.

The SNS data may include recommendation information from SNS members for programs relating to the program information, reply message information from SNS members for programs relating to the program information, data that provides an indication of numbers of SNS members that have previously viewed programs relating to the program information, and/or data that provides an indication of numbers of SNS members currently viewing programs relating to the program information. The program information may be output for display in a priority based on the stored SNS data.

The OSD generator may output for simultaneous display the SNS data and program information of the plurality of channels. The program information may include thumbnail images, and/or may include information from an electronic program guide. Also, the program information may be indicative of programs currently received through the plurality of channels.

The OSD generator may output for display one or more options for controlling a type of the SNS data, and the one or more options may be output with the program information of the plurality of channels.

In accordance with another embodiment, a method for controlling a television comprises receiving data from a social network service (SNS); storing the SNS data in a first storage area; receiving program info nation of a plurality of channels; storing the program information in a second storage area; outputting the program information of the plurality of channels for display, wherein the program information is output for display based on the stored SNS data and wherein the SNS data corresponds to a plurality of members of the social network service.

The SNS data may include recommendation information from SNS members for programs relating to the program information, reply message information from SNS members for programs relating to the program information, data that provides an indication of numbers of SNS members who have previously viewed programs corresponding to the program information, and/or data that provides an indication of numbers of SNS members who are currently viewing programs relating to the program information. The SNS data and program information may be output for simultaneous display on the television.

The program information may include information from an electronic program guide, and the SNS data may be output for simultaneous display with the information from the electronic program guide. One or more options for controlling a type of the SNS data may be displayed with the program information. The method may be executed by software, one or more circuits, or a combination thereof in the television or in a box or other device coupled to the television such as but not limited to a set-top or other type of multimedia box. Also, the method may be applied to a display device different from a television as described herein.

One or more embodiments described herein may display a viewing situation of at least one user connected to an SNS by providing a channel guide screen or a channel browsing screen. These or other embodiments may also define a protocol for rearranging a position of a thumbnail image of each channel in accordance with a specific priority using additional data related to an SNS, and/or may provide a user interface that is able to more quickly switch between a channel guide or browsing screen and an SNS-related screen.

The embodiments described herein may be applied to a variety of display devices including but not limited to a network TV, a smart TV, an HBBTV (hybrid broadcast broadband television), an internet TV, a web TV, or an IPTV (internet protocol television).

As an example, a display apparatus may be an intelligent network TV having a computer support function in addition to a broadcast receiving function. Since an internet function and the like are added to the display apparatus based on the broadcast receiving function, it may be able to provide such a convenient interface as a manual input device, a touchscreen, a space remote controller and the like. The display apparatus may access internet or computer owing to the support of a wire/wireless internet function to perform such a function as a web browsing function, a banking function, a game function and the like. For the various functions, it is able to use a standardized universal operating system (OS).

Therefore, a display apparatus according to at least one embodiment may be able to add/delete various applications to/from a universal OS kernel for example, thereby performing various kinds of user-friendly functions.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one or more embodiments may be combined with the features of the other embodiments to form new embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for a television comprising:
   an on-screen display (OSD) generator;
   a first interface to receive signals for controlling a television;
   a second interface to request social network service (SNS) data on a tuned channel of a plurality of channels to a social network service server and to receive the requested SNS data on the tuned channel from the social network service server;
   a storage device to store program information relating to the plurality of channels and the received SNS data, the received SNS data including first numerical data and second numerical data related to each of the plurality of channels; and
   a controller to control the OSD generator to generate a channel guide based on the stored program information and the SNS data, and to display the generated channel guide on a screen, the channel guide including a first menu and a second menu for rearranging program information in the channel guide according to different conditions,
   wherein when the first menu is selected through the first interface, the controller controls the OSD generator to rearrange the program information in the channel guide in order from a channel having a highest value of the first numerical data to a channel having a smallest value of the first numerical data, and
   when the second menu is selected through the first interface, the controller controls the OSD generator to rearrange the program information in the channel guide in order from a channel having a greatest value of the second numerical data to a channel having a smallest value of the second numerical data, and
   wherein the SNS data is based on a plurality of members of the social network service.

2. The apparatus of claim 1, wherein the SNS data includes recommendation information from SNS members for programs relating to the program information.

3. The apparatus of claim 1, wherein the SNS data includes reply message information from SNS members for programs relating to the program information.

4. The apparatus of claim 1, wherein the SNS data provides an indication of numbers of SNS members that have previously viewed programs relating to the program information.

5. The apparatus of claim 1, wherein the SNS data provides an indication of numbers of SNS members who are currently viewing programs relating to the program information.

6. The apparatus of claim 1, wherein the program information is output for display in a priority based on the stored SNS data.

7. The apparatus of claim 1, wherein the OSD generator outputs for simultaneous display the SNS data and program information of the plurality of channels.

8. The apparatus of claim 1, wherein the program information is stored in a first storage area of the storage device and the SNS data is stored in a second storage area of the storage device.

9. The apparatus of claim 1, wherein the program information includes information from an electronic program guide.

10. The apparatus of claim 1, wherein the program information is indicative of programs currently received through the plurality of channels.

11. A method for controlling a television, comprising:
requesting social network service (SNS) data on a tuned channel of a plurality of channels to a social network service server;
receiving the requested SNS data on the tuned channel from the social network service server;
receiving program information of the plurality of channels;
storing the received SNS data and the received program information in a storage device, the received SNS data including first numerical data and second numerical data related to each of the plurality of channels;
generating a channel guide based on the stored program information and the SNS data;
displaying the generated channel guide on a screen, the channel guide including a first menu and a second menu for rearranging program information in the channel guide according to different conditions; and
rearranging the program information in the channel guide according to the different conditions,
wherein when the first menu is selected, the program information in the channel guide is rearranged in order from a channel having a highest value of the first numerical data to a channel having a smallest value of the first numerical data, and when the second menu is selected, the program information in the channel guide is rearranged in order from a channel having a greatest value of the second numerical data to a channel having a smallest value of the second numerical data, and wherein the SNS data corresponds to a plurality of members of the social network service.

12. The method of claim 11, wherein the SNS data includes recommendation information from SNS members for programs relating to the program information.

13. The method of claim 11, wherein the SNS data includes reply message information from SNS members for programs relating to the program information.

14. The method of claim 11, wherein the SNS data provides an indication of numbers of SNS members who have previously viewed programs corresponding to the program information.

15. The method of claim 11, wherein the SNS data provides an indication of numbers of SNS members who are currently viewing programs relating to the program information.

16. The method of claim 11, wherein the SNS data and program information are output for simultaneous display on the television.

17. The method of claim 11, wherein the program information includes information from an electronic program guide.

18. The method of claim 17, wherein the SNS data is output for simultaneous display with the information from the electronic program guide.

* * * * *